United States Patent
Yonemura et al.

(10) Patent No.: US 12,428,699 B2
(45) Date of Patent: Sep. 30, 2025

(54) AUSTENITIC STAINLESS STEEL FOIL

(71) Applicant: NIPPON STEEL Chemical & Material Co., Ltd., Tokyo (JP)

(72) Inventors: Mitsuharu Yonemura, Tokyo (JP); Keiichi Kimura, Tokyo (JP); Takuya Hiraga, Tokyo (JP); Yuji Kuma, Tokyo (JP)

(73) Assignee: NIPPON STEEL CHEMICAL & MATERIAL CO., LTD., Tokyo (JP)

( * ) Notice: Subject to any disclaimer, the term of this patent is extended or adjusted under 35 U.S.C. 154(b) by 404 days.

(21) Appl. No.: 18/031,193

(22) PCT Filed: Oct. 12, 2021

(86) PCT No.: PCT/JP2021/037756
§ 371 (c)(1),
(2) Date: Apr. 11, 2023

(87) PCT Pub. No.: WO2022/080374
PCT Pub. Date: Apr. 21, 2022

(65) Prior Publication Data
US 2023/0407427 A1    Dec. 21, 2023

(30) Foreign Application Priority Data

Oct. 13, 2020 (JP) .................. 2020-172594
Oct. 13, 2020 (JP) .................. 2020-172595
Aug. 30, 2021 (JP) .................. 2021-140134

(51) Int. Cl.
C21D 9/46    (2006.01)
C22C 38/00   (2006.01)
(Continued)

(52) U.S. Cl.
CPC ............. *C21D 9/46* (2013.01); *C22C 38/001* (2013.01); *C22C 38/002* (2013.01); *C22C 38/02* (2013.01);
(Continued)

(58) Field of Classification Search
CPC ........................................................ C21D 9/46
See application file for complete search history.

(56) References Cited

U.S. PATENT DOCUMENTS

2006/0150388 A1* 7/2006 Inada .................. C22C 38/58
                                                         29/516
2013/0089182 A1* 4/2013 Wang .................. G01N 23/20
                                                         378/72
(Continued)

FOREIGN PATENT DOCUMENTS

JP    1-309919 A       12/1989
JP    2005-307295 A    11/2005

OTHER PUBLICATIONS

Parikin, et al., "Measurements of residual stresses in cold-rolled 304 stainless steel plates using x-ray diffraction with Rietveld refinement method," Atom Indonesia 35(1) (2011).*
(Continued)

*Primary Examiner* — Christopher S Kessler
(74) *Attorney, Agent, or Firm* — Birch, Stewart, Kolasch & Birch, LLP

(57) ABSTRACT

An austenitic stainless steel foil according to this disclosure consists of, in mass %, C: 0.150% or less, Si: 1.00% or less, Mn: 2.00% or less, P: 0.045% or less, S: 0.0300% or less, Cr: 16.00 to 20.00%, Ni: 6.00 to 10.50%, N: 0.100% or less, Mo: 0 to 2.50%, Nb: 0 to 0.12%, V: 0 to 1.00%, Ta: 0 to 0.50%, Hf: 0 to 0.10%, Co: 0 to 0.50%, B: 0 to 0.0100%, Ca: 0 to 0.0200%, Mg: 0 to 0.0200%, rare earth metal: 0 to 0.0100%, Al: 0 to 0.010%, Ti: 0 to 0.500%, Zr: 0 to 0.100%, and Cu: 0 to 3.00%, with the balance being Fe and impu-
(Continued)

rities. In an X-ray diffraction profile obtained using CuKα radiation, a full width at half maximum Fw of a peak of a {111} plane is greater than 0.366°.

8 Claims, 2 Drawing Sheets

(51) Int. Cl.
  *C22C 38/02* (2006.01)
  *C22C 38/58* (2006.01)
(52) U.S. Cl.
  CPC ........ *C22C 38/58* (2013.01); *C21D 2211/001* (2013.01); *C21D 2211/008* (2013.01)

(56) References Cited

U.S. PATENT DOCUMENTS

| | | | | |
|---|---|---|---|---|
| 2018/0229476 | A1* | 8/2018 | Unno | C21D 8/0257 |
| 2023/0399728 | A1* | 12/2023 | Tanaka | C22C 38/58 |
| 2023/0407427 | A1* | 12/2023 | Yonemura | C22C 38/005 |
| 2024/0150880 | A1* | 5/2024 | Kimura | C22C 38/40 |

OTHER PUBLICATIONS

Murugesan, S., et al. "X-ray diffraction Rietveld analysis of cold worked austenitic stainless steel." Materials Letters 67(1) (2012): 173-176.*

* cited by examiner

⊙ Width Direction of Steel Foil

AUSTENITIC STAINLESS STEEL FOIL

TECHNICAL FIELD

The present disclosure relates to a stainless steel foil, and more particularly relates to an austenitic stainless steel foil.

BACKGROUND ART

With the development of electronic equipment, there is a demand for materials that can be used in more severe environments than in the past. For example, in the case of a material used for a smartphone that can be folded (foldable smartphone), because the material will be subjected to repeated bending stress, a material that has excellent fatigue strength is required. Therefore, instead of resins and light metal materials which have conventionally been used, there is a demand for an austenitic stainless steel foil that has excellent fatigue strength as a material for electronic equipment. Note that the term "steel foil" as used in the present description means a steel sheet that has a thickness of 100 μm or less.

In recent years, techniques for further increasing the fatigue strength of austenitic stainless steel foils have been proposed. For example, Japanese Patent Application Publication No. 1-309919 (Patent Literature 1) and Japanese Patent Application Publication No. 2005-307295 (Patent Literature 2) propose techniques for increasing the fatigue strength of austenitic stainless steel foils.

A stainless steel foil disclosed in Patent Literature 1 is obtained by subjecting a stainless steel consisting of, in wt %, C: 0.02 to 0.2%, Si: 0.1 to 2%, Mn: 0.1 to 2%, S: 0.006% or less, Ni: 6.0 to 10.5%, Cr: 16 to 20%, Al: 0.01% or less, O: 0.01% or less, Mg: 0.001% or less, Ca: 0.0001 to 0.005%, and N: 0.01 to 0.2%, with the balance being Fe, to repeated cold rolling and annealing to control the total rolling reduction ratio of the cold rolling to 98% or more and make the final sheet thickness 100 μm or less, and make the size of inclusions 7 μm or less. It is described in Patent Literature 1 that the aforementioned stainless steel foil is excellent in fatigue characteristics.

An austenitic stainless steel foil for a spring disclosed in Patent Literature 2 is a stainless steel strip for a spring in accordance with JIS Z 4313 SUS 301-CSP, in which the mean spacing of local peaks Sm in a cross-sectional curve of the surface in a direction perpendicular to the rolling direction is 40 μm. It is described in Patent Literature 2 that the aforementioned austenitic stainless steel foil for a spring is excellent in durability (fatigue characteristics).

CITATION LIST

Patent Literature

Patent Literature 1: Japanese Patent Application Publication No. 1-309919
Patent Literature 2: Japanese Patent Application Publication No. 2005-307295

SUMMARY OF INVENTION

Technical Problem

According to the techniques proposed in the aforementioned Patent Literatures 1 and 2, austenitic stainless steel foils having excellent fatigue strength can be obtained. However, an austenitic stainless steel foil having excellent fatigue strength may also be obtained by a technique other than the techniques proposed in the aforementioned Patent Literatures 1 and 2.

An objective of the present disclosure is to provide an austenitic stainless steel foil that has excellent fatigue strength.

Solution to Problem

An austenitic stainless steel foil according to the present disclosure consists of, in mass %,
C: 0.150% or less,
Si: 1.00% or less,
Mn: 2.00% or less,
P: 0.045% or less,
S: 0.0300% or less,
Cr: 16.00 to 20.00%,
Ni: 6.00 to 10.50%,
N: 0.100% or less,
Mo: 0 to 2.50%,
Nb: 0 to 0.12%,
V: 0 to 1.00%,
Ta: 0 to 0.50%,
Hf: 0 to 0.10%,
Co: 0 to 0.50%,
B: 0 to 0.0100%,
Ca: 0 to 0.0200%,
Mg: 0 to 0.0200%,
rare earth metal: 0 to 0.0100%,
Al: 0 to 0.010%,
Ti: 0 to 0.500%,
Zr: 0 to 0.100%, and
Cu: 0 to 3.00%,
with the balance being Fe and impurities,
wherein:
in an X-ray diffraction profile obtained using CuKα radiation, a full width at half maximum Fw of a peak of a {111} plane is greater than 0.366°.

Advantageous Effects of Invention

The austenitic stainless steel foil according to the present disclosure has excellent fatigue strength.

DESCRIPTION OF EMBODIMENTS

Figure 1:
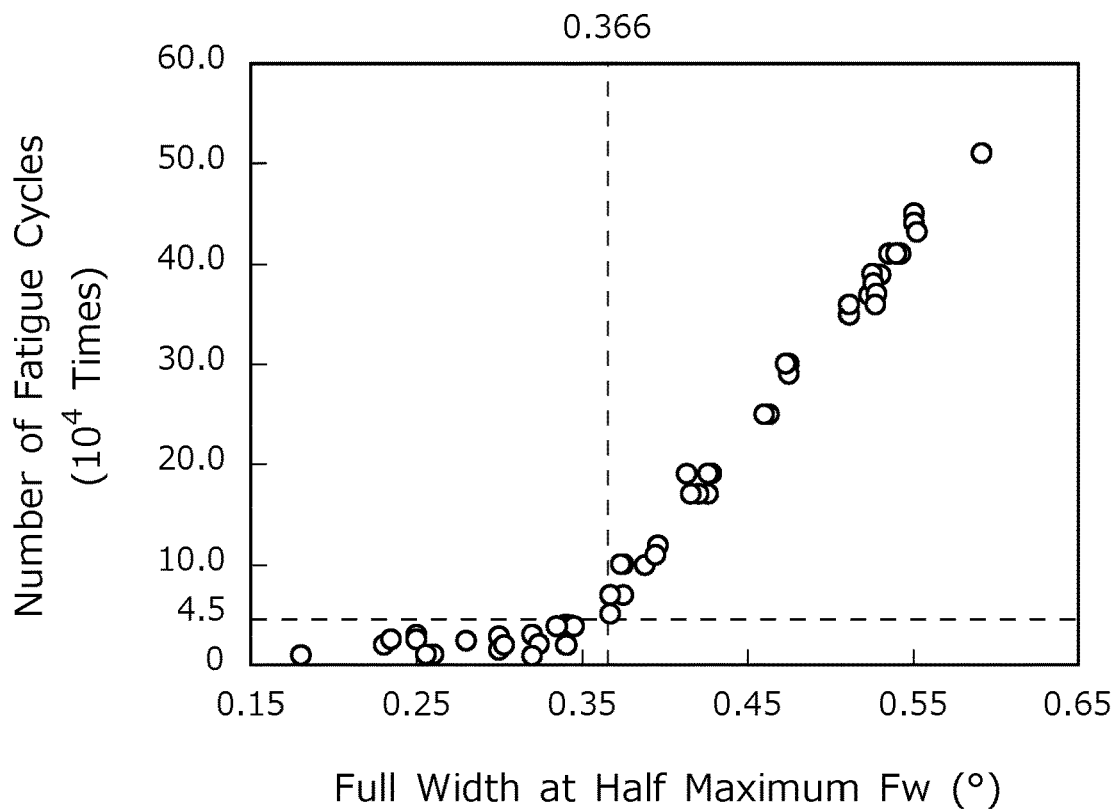
FIG. 1 is a view illustrating the relation between the full width at half maximum Fw of a peak of a {111} plane in an X-ray diffraction profile obtained using CuKα radiation and the number of fatigue cycles in the present examples.

The present inventors investigated and considered techniques for increasing the fatigue strength of an austenitic stainless steel foil. As a result, the present inventors obtained the following findings.

First, the present inventors focused their attention on the chemical composition, and investigated methods for obtaining an austenitic stainless steel foil that has excellent fatigue strength. As a result, the present inventors considered that if an austenitic stainless steel foil has a chemical composition consisting of, in mass %, C: 0.150% or less, Si: 1.00% or less, Mn: 2.00% or less, P: 0.045% or less, S: 0.0300% or less, Cr: 16.00 to 20.00%, Ni: 6.00 to 10.50%, N: 0.100% or less, Mo: 0 to 2.50%, Nb: 0 to 0.12%, V: 0 to 1.00%, Ta: 0 to 0.50%, Hf: 0 to 0.10%, Co: 0 to 0.50%, B: 0 to 0.0100%, Ca: 0 to 0.0200%, Mg: 0 to 0.0200%, rare earth metal: 0 to 0.0100%, Al: 0 to 0.010%, Ti: 0 to 0.500%, Zr: 0 to 0.100%, and Cu: 0 to 3.00%, with the balance being Fe and impurities, there is a possibility of increasing the fatigue strength.

Therefore, the present inventors produced various kinds of austenitic stainless steel foils having the aforementioned chemical composition, and checked the fatigue strength of the various kinds of austenitic stainless steel foils. As a result, it has been revealed that even when austenitic stainless steel foils have the aforementioned chemical composition, in some cases the austenitic stainless steel foils do not have excellent fatigue strength. Therefore, the present inventors conducted studies regarding the reason why fatigue strength decreases in an austenitic stainless steel foil having the aforementioned chemical composition, and also regarding methods for increasing the fatigue strength. As a result, the present inventors obtained the following findings.

Specifically, among lattice strain in the microstructure of austenitic stainless steel foils, the present inventors focused their attention on non-uniform strain. The term "non-uniform strain" means that lattice strain in crystals is randomly distributed, and factors that cause non-uniform strain are represented by dislocations. That is, in the microstructure of an austenitic stainless steel foil, the greater the amount of non-uniform strain that is present, the greater the possibility that the dislocation density will increase. Here, if the dislocation density in a steel material is increased, the strength of the steel material increases due to dislocation strengthening. If the strength of a steel material is increased, the fatigue limit of the steel material increases, and there is a possibility of increasing the number of repetitions until rupture in a case where stress is repeatedly applied. That is, if the dislocation density of a steel material is increased, the strength of the steel material increases due to dislocation strengthening, and there is a possibility that the fatigue strength of the steel material will increase.

Therefore, the present inventors conducted detailed investigations and studies regarding the relation between non-uniform strain and fatigue strength in an austenitic stainless steel foil having the aforementioned chemical composition. Here, the greater the amount of random lattice strain (non-uniform strain) is, the broader the shape of a peak of the {111} plane in an X-ray diffraction profile becomes. Therefore, the present inventors considered that the full width at half maximum of a peak of the {111} plane in an X-ray diffraction profile can be used as an index of non-uniform strain. This point will be described in detail using the drawings.

FIG. 1 is a view illustrating the relation between a full width at half maximum Fw of a peak of the {111} plane in an X-ray diffraction profile obtained using CuKα radiation and the number of fatigue cycles according to the present examples. FIG. 1 was created using the full width at half maximum Fw of a peak of the {111} plane in an X-ray diffraction profile obtained using CuKα radiation that is an index of non-uniform strain, and the number of fatigue cycles that is an index of fatigue strength with respect to austenitic stainless steel foils having the aforementioned chemical composition. Note that, the full width at half maximum Fw of a peak of the {111} plane in an X-ray diffraction profile obtained using CuKα radiation, and the number of fatigue cycles were determined by methods that are described later.

Referring to FIG. 1, with respect to austenitic stainless steel foils having the aforementioned chemical composition, in the relation between the full width at half maximum Fw of a peak of the {111} plane in an X-ray diffraction profile obtained using CuKα radiation and the number of fatigue cycles, an inflection point exists in the vicinity of a full width at half maximum Fw=0.366°. Further, it can be confirmed that when the full width at half maximum Fw of a peak of the {111} plane in an X-ray diffraction profile obtained using CuKα radiation is more than 0.366°, the number of fatigue cycles of the steel material markedly increases. Therefore, the austenitic stainless steel foil according to the present embodiment has the aforementioned chemical composition, and in addition, a full width at half maximum Fw of a peak of the {111} plane in an X-ray diffraction profile obtained using CuKα radiation is made greater than 0.366°. As a result, the austenitic stainless steel foil according to the present embodiment has excellent fatigue strength.

The gist of the austenitic stainless steel foil according to the present embodiment which has been completed based on the above findings is as follows.

[1]

An austenitic stainless steel foil, consisting of, in mass %,
C: 0.150% or less,
Si: 1.00% or less,
Mn: 2.00% or less,
P: 0.045% or less,
S: 0.0300% or less,
Cr: 16.00 to 20.00%,
Ni: 6.00 to 10.50%,
N: 0.100% or less,
Mo: 0 to 2.50%,
Nb: 0 to 0.12%,
V: 0 to 1.00%,
Ta: 0 to 0.50%,
Hf: 0 to 0.10%,
Co: 0 to 0.50%,
B: 0 to 0.0100%,
Ca: 0 to 0.0200%,
Mg: 0 to 0.0200%,
rare earth metal: 0 to 0.0100%,
Al: 0 to 0.010%,
Ti: 0 to 0.500%,
Zr: 0 to 0.100%, and
Cu: 0 to 3.00%,
with the balance being Fe and impurities,
wherein:
in an X-ray diffraction profile obtained using CuKα radiation, a full width at half maximum Fw of a peak of a {111} plane is greater than 0.366°.

The austenitic stainless steel foil of [1] has excellent fatigue strength.

[2]

The austenitic stainless steel foil according to [1], containing one or more elements selected from a group consisting of:
Mo: 0.01 to 2.50%,
Nb: 0.01 to 0.12%,
V: 0.01 to 1.00%,
Ta: 0.01 to 0.50%,
Hf: 0.01 to 0.10%,
Co: 0.01 to 0.50%,
B: 0.0001 to 0.0100%, Ca: 0.0001 to 0.0200%,
Mg: 0.0001 to 0.0200%,
rare earth metal: 0.0001 to 0.0100%,
Al: 0.001 to 0.010%,
Ti: 0.001 to 0.500%,
Zr: 0.001 to 0.100%, and
Cu: 0.01 to 3.00%.

[3]

The austenitic stainless steel foil according to [1], wherein:
a uniform strain e is less than $-2.89 \times 10^{-4}$.

[4]

The austenitic stainless steel foil according to [2], wherein:
a uniform strain e is less than $-2.89 \times 10^{-4}$.

The austenitic stainless steel foil according to [3] or [4] has more excellent fatigue strength.

[5]

The austenitic stainless steel foil according to any one of [1] to [4], wherein:
in an X-ray diffraction profile obtained using CuKα radiation, a ratio of a lattice spacing {111}γ of {111} planes of an austenite phase to a lattice spacing {110}α' of {110} planes of a martensite phase satisfies Formula (1).

$$\{111\}\gamma/\{110\}\alpha' \geq 1.0220 \qquad (1)$$

The austenitic stainless steel foil of [5] also has excellent durability with respect to bending stress. As used in the present description, the phrase "excellent durability with respect to bending stress" means that even when repeated bending stress is applied, it is difficult for a permanent deformation to occur.

The austenitic stainless steel foil according to the present embodiment will be described in detail below. The symbol "%" in relation to each element means mass percent unless otherwise noted.

[Chemical Composition]

The chemical composition of the austenitic stainless steel foil according to the present embodiment contains the following elements.

C: 0.150% or Less

Carbon (C) is unavoidably contained. That is, a lower limit of the content of C is more than 0%. C forms carbides and thereby increases the strength of the steel material. However, if the content of C is too high, even if the contents of other elements are within the range of the present embodiment, carbides will precipitate at grain boundaries, and the amount of precipitated intermetallic compounds at grain boundaries will decrease, and consequently the stability of the grain boundaries will decrease. Furthermore, if the content of C is too high, carbides will excessively precipitate and the toughness of the steel material will decrease. Therefore, the content of C is to be 0.150% or less. A preferable upper limit of the content of C is 0.140%, more preferably is 0.130%, and further preferably is 0.120%. Here, extremely reducing the content of C will significantly increase the production cost. Therefore, when taking industrial production into consideration, a preferable lower limit of the content of C is 0.001%, and more preferably is 0.005%.

Si: 1.00% or Less

Silicon (Si) is unavoidably contained. That is, a lower limit of the content of Si is more than 0%. Si deoxidizes the steel. However, if the content of Si is too high, even if the contents of other elements are within the range of the present embodiment, coarse oxides will remain in the steel material and the hot workability of the steel material will decrease. Therefore, the content of Si is to be 1.00% or less. A preferable upper limit of the content of Si is 0.95%, more preferably is 0.90%, and further preferably is 0.80%. Here, extremely reducing the content of Si will significantly increase the production cost. Therefore, when taking industrial production into consideration, a preferable lower limit of the content of Si is 0.01%, and more preferably is 0.05%.

Mn: 2.00% or Less

Manganese (Mn) is unavoidably contained. That is, a lower limit of the content of Mn is more than 0%. Mn deoxidizes the steel. Mn also stabilizes the austenite phase. In addition, Mn fixes S in the steel material as sulfide, thereby increasing the hot workability of the steel material. However, if the content of Mn is too high, even if the contents of other elements are within the range of the present embodiment, formation of a spinel-type oxide film will be promoted, and the oxidation resistance of the steel material at high temperatures will decrease. In addition, if the content of Mn is too high, strain-induced martensitic transformation that is caused by cold working may not be sufficiently obtained in some cases. In such a case, Fn1 cannot be sufficiently increased in the produced austenitic stainless steel foil. Therefore, the content of Mn is to be 2.00% or less. A preferable upper limit of the content of Mn is 1.90%, more preferably is 1.80%, and further preferably is 1.70%. A preferable lower limit of the content of Mn for effectively obtaining the aforementioned effects is 0.30%, and more preferably is 0.50%.

P: 0.045% or Less

Phosphorus (P) is an impurity. That is, a lower limit of the content of P is more than 0%. If the content of P is too high, even if the contents of other elements are within the range of the present embodiment, grain boundaries will be embrittled and the stress relaxation cracking susceptibility of the steel material will increase. Therefore, the content of P is to be 0.045% or less. A preferable upper limit of the content of P is 0.040%, and more preferably is 0.035%. The content of P is preferably as low as possible. However, extremely reducing the content of P will significantly increase the production cost. Therefore, when taking industrial production into consideration, a preferable lower limit of the content of P is 0.001%, and more preferably is 0.003%.

S: 0.0300% or Less

Sulfur (S) is an impurity. That is, a lower limit of the content of S is more than 0%. If the content of S is too high, even if the contents of other elements are within the range of the present embodiment, S will segregate at grain boundaries, and the stress relaxation cracking susceptibility of the steel material will increase. Therefore, the content of S is 0.0300% or less. A preferable upper limit of the content of S is 0.0200%, more preferably is 0.0150%, and further preferably is 0.0100%. The content of S is preferably as low as possible. However, extremely reducing the content of S will significantly increase the production cost. Therefore, when taking industrial production into consideration, a preferable lower limit of the content of S is 0.0001%, and more preferably is 0.0003%.

Cr: 16.00 to 20.00%

Chromium (Cr) increases the oxidation resistance, the steam oxidation resistance, and the corrosion resistance such as the high-temperature corrosion resistance of the steel material. Cr also forms carbides and increases the strength of the steel material, and increases the lattice spacing of the austenite phase. If the content of Cr is too low, even if the contents of other elements are within the range of the present embodiment, the aforementioned effects will not be sufficiently obtained. Furthermore, if the content of Cr is too low, strain-induced martensitic transformation caused by cold working will excessively occur, and an austenite phase may not be sufficiently obtained in some cases. On the other hand, if the content of Cr is too high, even if the contents of other elements are within the range of the present embodiment, α-Cr phase or a phase will excessively precipitate, and the corrosion resistance of the steel material will decrease. Therefore, the content of Cr is to be 16.00 to 20.00%. A preferable lower limit of the content of Cr is 16.05%, more preferably is 16.10%, and further preferably is 16.20%. A preferable upper limit of the content of Cr is 19.95%, more preferably is 19.90%, and further preferably is 19.80%.

Ni: 6.00 to 10.50%

Nickel (Ni) stabilizes austenite. Ni also increases the ductility of the steel material. If the content of Ni is too low, even if the contents of other elements are within the range of the present embodiment, the aforementioned effects will not be sufficiently obtained. On the other hand, if the content of Ni is too high, even if the contents of other elements are within the range of the present embodiment, the deformation resistance within grains will increase and the ductility of the steel material will decrease. Furthermore, if the content of Ni is too high, strain-induced martensitic transformation caused by cold working may not be sufficiently obtained in some cases. Therefore, the content of Ni is to be 6.00 to 10.50%. A preferable lower limit of the content of Ni is 6.10%, more preferably is 6.20%, and further preferably is 6.30%. A preferable upper limit of the content of Ni is 10.40%, more preferably is 10.20%, and further preferably is 10.00%.

N: 0.100% or Less

Nitrogen (N) is unavoidably contained. That is, the content of N is more than 0%. N dissolves in the steel material and increases the strength of the steel material. N also stabilizes the austenite phase. On the other hand, if the content of N is too high, even if the contents of other elements are within the range of the present embodiment, the strength of the steel material will be too high, and the ductility of the steel material will decrease. Furthermore, if the content of N is too high, strain-induced martensitic transformation caused by cold working may not be sufficiently obtained in some cases. Therefore, the content of N is to be 0.100% or less. A preferable lower limit of the content of N for effectively obtaining the aforementioned effects is 0.001%, more preferably is 0.005%, and further preferably is 0.010%. A preferable upper limit of the content of N is 0.090%, more preferably is 0.080%, and further preferably is 0.060%.

The balance in the chemical composition of the austenitic stainless steel foil according to the present embodiment is Fe and impurities. Here, the term "impurities" refers to elements which, during industrial production of the austenitic stainless steel foil, are mixed in from ore or scrap that is used as a raw material or from the production environment or the like, and which are allowed within a range that does not adversely affect the austenitic stainless steel foil of the present embodiment.

[Optional Elements]

The austenitic stainless steel foil according to the present embodiment may further contain one or more elements selected from the group consisting of Mo, Nb, V, Ta, Hf, and Co in lieu of a part of Fe. Each of these elements is an optional element, and increases the strength of the steel material.

Mo: 0 to 2.50%

Molybdenum (Mo) is an optional element, and need not be contained. That is, the content of Mo may be 0%. When contained, Mo dissolves in the steel material and increases the strength of the steel material. In this case, in addition, Mo forms carbides in the steel material and thereby increases the strength of the steel material. If even a small amount of Mo is contained, the aforementioned effects will be obtained to a certain extent. However, if the content of Mo is too high, even if the contents of other elements are within the range of the present embodiment, the strength of the steel material will become too high and the hot workability of the steel material will decrease. Therefore, the content of Mo is to be 0 to 2.50%. A preferable lower limit of the content of Mo is more than 0%, more preferably is 0.01%, further preferably is 0.05%, and further preferably is 0.10%. A preferable upper limit of the content of Mo is 2.20%, more preferably is 2.00%, and further preferably is 1.70%.

Nb: 0 to 0.12%

Niobium (Nb) is an optional element, and need not be contained. That is, the content of Nb may be 0%. When contained, Nb refines the grains of the steel material and enhances the corrosion resistance of the steel material. If even a small amount of Nb is contained, the aforementioned effect will be obtained to a certain extent. However, if the content of Nb is too high, even if the contents of other elements are within the range of the present embodiment, coarse carbides will be formed, and the strength, ductility, and hot workability of the steel material will decrease. Therefore, the content of Nb is to be 0 to 0.12%. A preferable lower limit of the content of Nb is more than 0%, more preferably is 0.01%, and further preferably is 0.02%. A preferable upper limit of the content of Nb is 0.10%, and more preferably is 0.09%.

V: 0 to 1.00%

Vanadium (V) is an optional element, and need not be contained. That is, the content of V may be 0%. When contained, V forms carbo-nitrides and/or intermetallic compounds, and increases the strength of the steel material. In this case, in addition, V refines the grains of the steel material. If even a small amount of V is contained, the aforementioned effects will be obtained to a certain extent. However, if the content of V is too high, even if the contents of other elements are within the range of the present embodiment, the ductility and toughness of the steel material will decrease due to the occurrence of high temperature corrosion and precipitation of a brittle phase. Therefore, the content of V is to be 0 to 1.00%. A preferable lower limit of the content of V is more than 0%, more preferably is 0.01%, and further preferably is 0.03%. A preferable upper limit of the content of V is 0.90%, and more preferably is 0.80%.

Ta: 0 to 0.50%

Tantalum (Ta) is an optional element, and need not be contained. That is, the content of Ta may be 0%. When contained, Ta strengthens the grain boundaries and increases the strength of the steel material. If even a small amount of Ta is contained, the aforementioned effect will be obtained to a certain extent. However, if the content of Ta is too high, even if the contents of other elements are within the range of the present embodiment, the hot workability will decrease. Therefore, the content of Ta is to be 0 to 0.50%. A preferable lower limit of the content of Ta is more than 0%, more preferably is 0.01%, and further preferably is 0.03%. A preferable upper limit of the content of Ta is 0.45%, and more preferably is 0.40%.

Hf: 0 to 0.10%

Hafnium (Hf) is an optional element, and need not be contained. That is, the content of Hf may be 0%. When contained, Hf strengthens the grain boundaries and increases the strength of the steel material. If even a small amount of Hf is contained, the aforementioned effect will be obtained to a certain extent. However, if the content of Hf is too high, even if the contents of other elements are within the range of the present embodiment, the hot workability will decrease. Therefore, the content of Hf is to be 0 to 0.10%. A preferable lower limit of the content of Hf is more than 0%, more preferably is 0.01%, and further preferably is 0.03%. A preferable upper limit of the content of Hf is 0.09%, and more preferably is 0.08%.

Co: 0 to 0.50%

Cobalt (Co) is an optional element, and need not be contained. That is, the content of Co may be 0%. When contained, Co dissolves in the steel material and increases the strength of the steel material. If even a small amount of Co is contained, the aforementioned effect will be obtained to a certain extent. However, if the content of Co is too high, even if the contents of other elements are within the range of the present embodiment, the strength of the steel material will become too high and the hot workability of the steel material will decrease. Therefore, the content of Co is to be 0 to 0.50%. A preferable lower limit of the content of Co is more than 0%, more preferably is 0.01%, and further preferably is 0.05%. A preferable upper limit of the content of Co is 0.45%, and more preferably is 0.40%.

The austenitic stainless steel foil according to the present embodiment may further contain one or more elements selected from the group consisting of B, Ca, Mg, and rare earth metal in lieu of a part of Fe. Each of these elements is an optional element, and increases the hot workability of the steel material.

B: 0 to 0.0100%

Boron (B) is an optional element, and need not be contained. That is, the content of B may be 0%. When contained, B suppresses precipitation of carbides, and increases the high-temperature toughness of the steel material by an effect that refines precipitates. If even a small amount of B is contained, the aforementioned effects will be obtained to a certain extent. However, if the content of B is too high, even if the contents of other elements are within the range of the present embodiment, boron nitride (BN) will be produced, which will cause the toughness of the steel material to decrease. Therefore, the content of B is to be 0 to 0.0100%. 0.0001%. A preferable lower limit of the content of B is more than 0%, more preferably is further preferably is 0.0005%, and further preferably is 0.0010%. A preferable upper limit of the content of B is 0.0080%, more preferably is 0.0070%, and further preferably is 0.0050%.

Ca: 0 to 0.0200%

Calcium (Ca) is an optional element, and need not be contained. That is, the content of Ca may be 0%. When contained, Ca fixes S in the steel material as a sulfide, and thereby increases the hot workability of the steel material. If even a small amount of Ca is contained, the aforementioned effect will be obtained to a certain extent. However, if the content of Ca is too high, even if the contents of other elements are within the range of the present embodiment, coarse oxides will be formed and the hot workability and ductility of the steel material will decrease. Therefore, the content of Ca is to be 0 to 0.0200%. A preferable lower limit of the content of Ca is more than 0%, more preferably is 0.0001%, and further preferably is 0.0003%. A preferable upper limit of the content of Ca is 0.0180%, and more preferably is 0.0150%.

Mg: 0 to 0.0200%

Magnesium (Mg) is an optional element, and need not be contained. That is, the content of Mg may be 0%. When contained, Mg fixes S in the steel material as a sulfide, and thereby increases the hot workability of the steel material. If even a small amount of Mg is contained, the aforementioned effect will be obtained to a certain extent. However, if the content of Mg is too high, even if the contents of other elements are within the range of the present embodiment, coarse oxides will be formed and the hot workability and ductility of the steel material will decrease. Therefore, the content of Mg is to be 0 to 0.0200%. A preferable lower limit of the content of Mg is more than 0%, more preferably is 0.0001%, and further preferably is 0.0003%. A preferable upper limit of the content of Mg is 0.0180%, and more preferably is 0.0150%.

Rare Earth Metal: 0 to 0.0100%

Rare earth metal (REM) is an optional element, and need not be contained. That is, the content of REM may be 0%. When contained, REM fixes S in the steel material as a sulfide, and thereby increases the hot workability of the steel material. REM also increases the adhesiveness of a $Cr_2O_3$ protection film on the steel material surface, thereby increasing the oxidation resistance of the steel material. In addition, REM strengthens the grain boundaries, thereby increasing the strength and rupture strain of the steel material. If even a small amount of REM is contained, the aforementioned effects will be obtained to a certain extent. However, if the content of REM is too high, even if the contents of other elements are within the range of the present embodiment, coarse oxides will be formed and the hot workability of the steel material will decrease. Therefore, the content of REM is to be 0 to 0.0100%. A preferable lower limit of the content of REM is more than 0%, more preferably is 0.0001%, and further preferably is 0.0003%. A preferable upper limit of the content of REM is 0.0090%, and more preferably is 0.0080%.

Note that, in the present description the term "REM" means one or more elements selected from the group consisting of scandium (Sc) which is the element with atomic number 21, yttrium (Y) which is the element with atomic number 39, and the elements from lanthanum (La) with atomic number 57 to lutetium (Lu) with atomic number 71 that are lanthanoids. Further, in the present description, the term "content of REM" refers to the total content of these elements.

The austenitic stainless steel foil according to the present embodiment may further contain one or more elements selected from the group consisting of Al, Ti, and Zr in lieu of a part of Fe. Each of these elements is an optional element, and deoxidizes the steel material.

Al: 0 to 0.010%

Aluminum (Al) is an optional element, and need not be contained. That is, the content of Al may be 0%. When contained, Al deoxidizes the steel. If even a small amount of Al is contained, the aforementioned effect will be obtained to a certain extent. However, if the content of Al is too high, even if the contents of other elements are within the range of the present embodiment, coarse inclusions will be formed and the fatigue strength of the steel material will decrease. Therefore, the content of Al is to be 0 to 0.010%. A preferable lower limit of the content of Al is more than 0%, more preferably is 0.001%, and further preferably is 0.002%. A preferable upper limit of the content of Al is 0.009%, and more preferably is 0.008%.

Ti: 0 to 0.500%

Titanium (Ti) is an optional element, and need not be contained. That is, the content of Ti may be 0%. When contained, Ti deoxidizes the steel. If even a small amount of Ti is contained, the aforementioned effect will be obtained to a certain extent. However, if the content of Ti is too high, even if the contents of other elements are within the range of the present embodiment, coarse inclusions will be formed and the hot workability of the steel material will decrease. Therefore, the content of Ti is to be 0 to 0.500%. A preferable lower limit of the content of Ti is more than 0%, more preferably is 0.001%, and further preferably is 0.002%. A preferable upper limit of the content of Ti is 0.450%, and more preferably is 0.400%.

Zr: 0 to 0.100%

Zirconium (Zr) is an optional element, and need not be contained. That is, the content of Zr may be 0%. When contained, Zr deoxidizes the steel. If even a small amount of Zr is contained, the aforementioned effect will be obtained to a certain extent. However, if the content of Zr is too high, even if the contents of other elements are within the range of the present embodiment, the toughness and hot workability of the steel material will decrease. Therefore, the content of Zr is to be 0 to 0.100%. A preferable lower limit of the content of Zr is more than 0%, more preferably is 0.001%, and further preferably is 0.002%. A preferable upper limit of the content of Zr is 0.090%, and more preferably is 0.080%.

The austenitic stainless steel foil according to the present embodiment may further contain Cu in lieu of a part of Fe.

Cu: 0 to 3.00%

Copper (Cu) is an optional element, and need not be contained. That is, the content of Cu may be 0%. When contained, Cu increases the corrosion resistance and oxidation resistance of the steel material. If even a small amount of Cu is contained, the aforementioned effect will be obtained to a certain extent. However, if the content of Cu is too high, even if the contents of other elements are within the range of the present embodiment, grain boundary embrittlement will be promoted at high temperatures, and the hot workability of the steel material will decrease. Therefore, the content of Cu is to be 0 to 3.00%. A preferable lower limit of the content of Cu is more than 0%, more preferably is 0.01%, further preferably is 0.05%, and further preferably is 0.10%. A preferable upper limit of the content of Cu is 2.20%, more preferably is 2.00%, and further preferably is 1.70%.

[Method for Measuring Chemical Composition of Austenitic Stainless Steel Foil]

The chemical composition of the austenitic stainless steel foil according to the present embodiment can be measured by a well-known component analysis method. Specifically, a machined chip is collected from the austenitic stainless steel foil. The collected machined chip is dissolved in acid to obtain a liquid solution. The liquid solution is subjected to ICP-AES (Inductively Coupled Plasma Atomic Emission Spectrometry) to perform elementary analysis of the chemical composition. The content of C and the content of S are determined by a well-known high-frequency combustion method (combustion-infrared absorption method). The content of N is determined using a well-known inert gas fusion-thermal conductivity method.

Note that, the content of each element is taken as a numerical value that is obtained by rounding off a fraction (number that is one place to the right of the least significant digit) of the content of the element defined in the present embodiment. For example, the content of C is taken as a numerical value up to the third decimal place that is obtained by rounding off the fourth decimal place of the value determined by the above method. Similarly, in the present embodiment, for the content of each element other than the C content, a numerical value that is obtained by rounding off a fraction of the content of the element defined in the present embodiment with respect to a value determined by the above method is taken as the content of the relevant element. Note that, the term "rounding off" means rounding down if the fraction is 4 or less, and rounding up if the fraction is 5 or more.

[Non-Uniform Strain]

In the austenitic stainless steel foil according to the present embodiment, a full width at half maximum Fw of a peak of the {111} plane in an X-ray diffraction profile obtained using CuKα radiation is greater than 0.366°. Here, the full width at half maximum Fw of a peak of the {111} plane in an X-ray diffraction profile corresponds to random lattice strain as typified by dislocations. Specifically, the larger the full width at half maximum Fw of a peak of the {111} plane in an X-ray diffraction profile obtained using CuKα radiation is, the greater the non-uniform strain is. Further, as mentioned above, factors that cause non-uniform strain that is random lattice strain are represented by dislocations. That is, the higher the dislocation density is, the greater the possibility that the strength of the steel material will increase due to dislocation strengthening, and the fatigue strength will also increase.

In addition, as described above, referring to FIG. 1, in the austenitic stainless steel foil according to the present embodiment having the aforementioned chemical composition, in the relation between the full width at half maximum Fw of a peak of the {111} plane in an X-ray diffraction profile obtained using CuKα radiation and the number of fatigue cycles, an inflection point exists in the vicinity of full width at half maximum Fw=0.366°. Further, when the full width at half maximum Fw of a peak of the {111} plane in an X-ray diffraction profile obtained using CuKα radiation is more than 0.366°, the number of fatigue cycles of the steel material markedly increases.

Therefore, in the austenitic stainless steel foil according to the present embodiment, the full width at half maximum Fw of a peak of the {111} plane in an X-ray diffraction profile obtained using CuKα radiation is made greater than 0.366°. As a result, the austenitic stainless steel foil according to the present embodiment has excellent fatigue strength. In the present embodiment, a preferable lower limit of the full width at half maximum Fw of a peak of the {111} plane of the austenitic stainless steel foil is 0.368°, more preferably is 0.370°, further preferably is 0.380°, further preferably is 0.390°, further preferably is 0.400°, further preferably is 0.410°, further preferably is 0.420°, further preferably is 0.430°, and further preferably is 0.440°. In the present embodiment, an upper limit of the full width at half maximum Fw of a peak of the {111} plane of the austenitic stainless steel foil is not particularly limited, and for example is 0.600°.

In the present embodiment, the full width at half maximum Fw of a peak of the {111} plane can be determined by the following method. A test specimen is prepared from the austenitic stainless steel foil according to the present embodiment. The size of the test specimen is not particularly limited, and the thickness of the test specimen is made the same as the thickness of the steel foil. The observation surface of the test specimen (surface of the steel foil) is measured by X-ray diffraction analysis (XRD) to obtain a diffraction profile. The XRD analysis is performed by employing CuKα radiation as the radiation source, 45 kV as the tube voltage, and 200 mA as the tube current. Further, measurement is performed by a focusing method in which the diffraction angle (2θ) is set to a range of 40 to 50 degrees, at a step of 0.01 degrees, and a rate of 1°/min. The peak of the {111} plane can be identified from the obtained diffraction profile, and the full width at half maximum Fw can be determined.

[Uniform Strain]

In the austenitic stainless steel foil according to the present embodiment, uniform strain is not particularly limited. However, in the austenitic stainless steel foil according to the present embodiment, a uniform strain e may be less than $-2.89 \times 10^{-4}$. Here, the term "uniform strain" means lattice strain that accompanies changes in the lattice spacing. More specifically, the term "uniform strain" as used in the present description means uniform strain in the (111) plane. The smaller the uniform strain e is, the more the unit lattice is distorted in the direction of microscopic compression. On the other hand, the greater the uniform strain e is, the more the unit lattice is distorted in the direction of microscopic elongation.

Here, the full width at half maximum Fw of the peak of the {111} plane has a correlation with non-uniform strain as represented by the dislocation density. That is, in the austenitic stainless steel foil according to the present embodiment in which the full width at half maximum Fw of a peak of the {111} plane in an X-ray diffraction profile obtained using CuKα radiation is made greater than 0.366°, there is a possibility of the dislocation density increasing. On the other hand, in the microstructure of a steel material subjected to repeated stress, in some cases dislocations become an origin of a crack due to the dislocations migration and accumulating.

That is, in the austenitic stainless steel foil according to the present embodiment, because it is easy for the dislocation density to become high, there is a possibility that a decrease in fatigue strength due to the accumulation of dislocations will materialize. Therefore, in the present embodiment, it is preferable to reduce the uniform strain e to less than $-2.89 \times 10^{-4}$. If the uniform strain is reduced, even if a case arises in which a crack occurs due to the accumulation of dislocations, propagation of the crack can be suppressed.

Therefore, in the austenitic stainless steel foil according to the present embodiment, in addition to the full width at half maximum Fw of a peak of the {111} plane in an X-ray diffraction profile obtained using CuKα radiation being made greater than 0.366°, preferably the uniform strain e is made less than $-2.89 \times 10^{-4}$. As a result, the austenitic stainless steel foil according to the present embodiment has more excellent fatigue strength. In the present embodiment, an upper limit of the uniform strain e of the austenitic stainless steel foil is more preferably $-2.90 \times 10^{-4}$, further preferably is $-3.50 \times 10^{-4}$, further preferably is $-3.90 \times 10^{-4}$, further preferably is $-4.20 \times 10^{-4}$, further preferably is $-4.60 \times 10^{-4}$, further preferably is $-5.20 \times 10^{-4}$, further preferably is $-5.60 \times 10^{-4}$, further preferably is $-6.10 \times 10^{-4}$, further preferably is $-6.50 \times 10^{-4}$, further preferably is $-6.80 \times 10^{-4}$, further preferably is $-7.20 \times 10^{-4}$, and further preferably is $-7.50 \times 10^{-4}$. In the present embodiment, a lower limit of the uniform strain e of the austenitic stainless steel foil is not particularly limited, and for example is $-37.20 \times 10^{-4}$.

In the present embodiment, the uniform strain e can be determined by the following method. Similarly to the method for measuring non-uniform strain that is described above, a diffraction profile is obtained by X-ray diffraction analysis (XRD). Specifically, a test specimen is prepared from the austenitic stainless steel foil according to the present embodiment. The size of the test specimen is not particularly limited, and the thickness of the test specimen is made the same as the thickness of the steel foil. The observation surface of the test specimen (surface of the steel foil) is measured by XRD to obtain a diffraction profile. In the XRD, CuKα radiation is used as the radiation source, the tube voltage is set to 45 kV, and the tube current is set to 200 mA. Further, measurement is performed by a focusing method in which the diffraction angle (2θ) is set to a range of 40 to 50 degrees, at a step of 0.01 degrees, and a rate of 1°/min.

The peak of the (111) plane is identified from the obtained diffraction profile, and a lattice spacing d (Å) is determined. The lattice spacing d (Å) can be determined by using the peak location (2θ) of the (111) plane, and Bragg's equation (Equation (A)).

$$d = \lambda/2 \sin\theta \quad (A)$$

Here, in Equation (A), the x-ray wavelength in Å is substituted for λ, and a value obtained by dividing the peak location of the (111) plane by 2 is substituted in ° for θ.

The uniform strain e can be determined using the obtained lattice spacing d (Å) of the (111) plane, and the following Equation (B).

$$e = (d - d_0)/d_0 \quad (B)$$

Here, in Equation (B), the lattice spacing in Å is substituted for d, and the lattice spacing of the (111) plane in a case where the test specimen has been subjected to tempering is substituted in Å for $d_0$. Note that, in the present embodiment, a measurement value 2.0782 Å is used as $d_0$.

[Lattice Spacing]

In the austenitic stainless steel foil according to the present embodiment, in addition, in an X-ray diffraction profile obtained using CuKα radiation, a ratio of a lattice spacing {111}γ of the {111} planes of the austenite phase to a lattice spacing {110}α' of the {110} planes of the martensite phase may satisfy the following Formula (1).

$$\{111\}\gamma/\{110\}\alpha' \geq 1.0220 \quad (1)$$

Here, an austenitic stainless steel foil to which repeated bending stress is applied preferably has not only excellent fatigue strength, but also has excellent durability with respect to bending stress. In the present description, the phrase "excellent durability with respect to bending stress" means that it is difficult for a permanent deformation to occur even when repeated bending stress is applied. If the durability with respect to bending stress is high, the shape can be maintained even when repeated bending stress is applied.

On the other hand, as will be described later, the austenitic stainless steel foil is a foil band shape having a thickness of 100 μm or less, and thus is extremely thin. When producing this kind of austenitic stainless steel foil, cold working is performed with a high reduction rate as will be described in a preferable production method that is described later. When an austenitic stainless steel material having the aforementioned chemical composition is subjected to cold working with a high reduction rate, strain-induced martensitic transformation occurs in the produced steel foil. As a result, the microstructure of the austenitic stainless steel foil having the aforementioned chemical composition can also include a martensite phase, and not just an austenite phase.

As a result of detailed studies conducted by the present inventors it has been revealed that strain at an interface between the austenite phase and the martensite phase is involved in the durability with respect to repeated bending stress. Specifically, it has been revealed that with respect to the lattice strain in the microstructure, the ratio of the lattice spacing {111}γ of the {111} planes of the austenite phase to the lattice spacing {110}α' of the {110} planes of the martensite phase is involved in the durability with respect to bending stress. This point will now be described in detail using the drawings.

Figure 2:
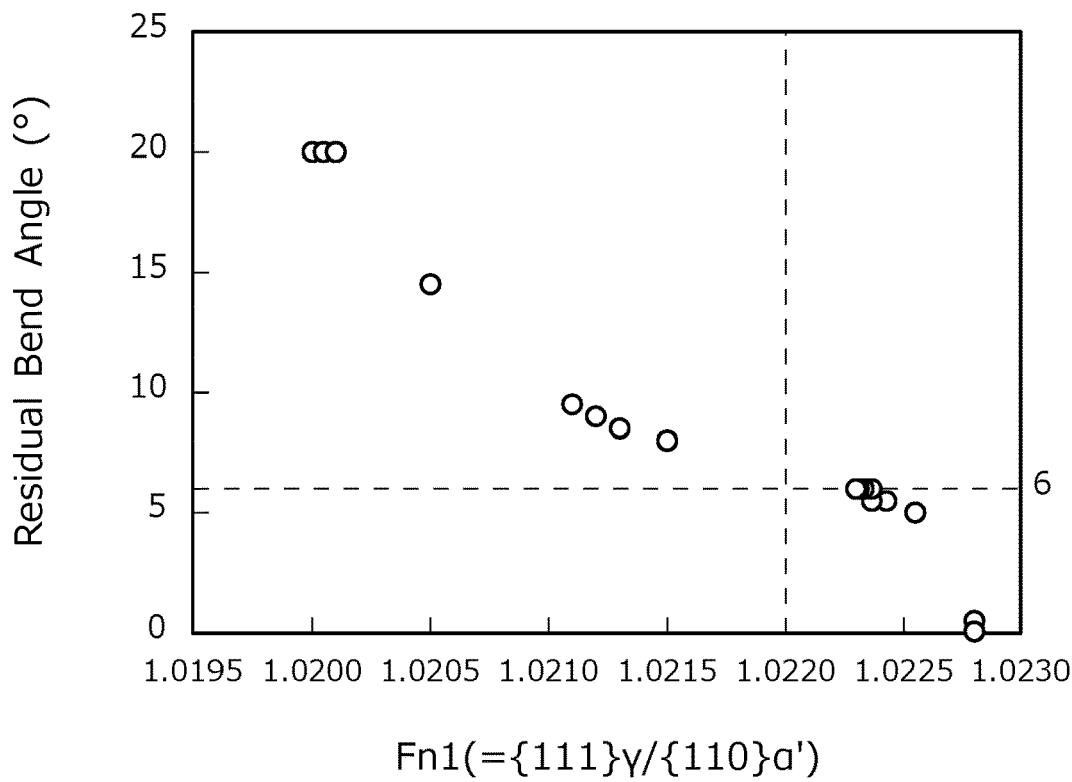
FIG. 2 is a view illustrating the relation between a ratio Fn1 (={111}γ/{110}α') of a lattice spacing {111}γ of the {111} planes of the austenite phase to a lattice spacing {110}α' of the {110} planes of the martensite phase of an austenitic stainless steel foil, and a residual bend angle that is an index of durability.

Let Fn1 be defined as Fn1={111}γ/{110}α'. FIG. 2 is a diagram illustrating the relation between Fn1 (={111}γ/{110}α) and a residual bending angle that is an index of durability. Note that, the term "residual bending" means permanent deformation that remains in a direction in which the steel foil was bent when repeated bending stress was applied. In other words, this means that the smaller the residual bend angle is, the higher the durability with respect to repeated bending stress is.

FIG. 2 was obtained using, with respect to one example of the austenitic stainless steel foil according to the present embodiment, Fn1 determined by a method that is described later, and a residual bend angle (°) determined by a method that is described later. Referring to FIG. 2, in an austenitic stainless steel foil which has the aforementioned chemical composition and in which a full width at half maximum Fw of a peak of the {111} plane in an X-ray diffraction profile obtained using CuKα radiation is greater than 0.366°, in the relation between Fn1 and the residual bend angle, an inflection point exists in the vicinity of Fn1=1.0220. Further, it can be confirmed that when Fn1 becomes 1.0220 or more, the residual bend angle stably decreases.

Therefore, the austenitic stainless steel foil according to the present embodiment has the aforementioned chemical composition, and in the austenitic stainless steel foil, a full width at half maximum Fw of a peak of the {111} plane in an X-ray diffraction profile obtained using CuKα radiation is greater than 0.366°, and in addition, preferably Fn1 is made 1.0220 or more. As a result, the austenitic stainless steel foil according to the present embodiment has excellent fatigue strength, and also has excellent durability with respect to repeated bending stress.

Note that, the present inventors surmise that the reason for this is as follows. Dislocations are introduced into the austenitic stainless steel foil by repeated bending stress. There is a possibility that plastic deformation that is typified by shear deformation occurs due to dislocations migration through crystals. On the other hand, in a case where the ratio of the lattice spacing of the {111} planes of the austenite phase to the lattice spacing of the {110} planes of the martensite phase is made large, strain at the interface between the austenite phase and the martensite phase increases, and migration of dislocations at the relevant interface is suppressed. As a result of the migration of dislocations being inhibited in this way, it is difficult for plastic deformation to occur. The present inventors surmise that, as a result, the durability of the austenitic stainless steel foil increases.

In the present embodiment, a more preferable lower limit of Fn1 is 1.0221, further preferably is 1.0222, further preferably is 1.0223, further preferably is 1.0224, further preferably is 1.0225, and further preferably is 1.0226. In the present embodiment, a preferable upper limit of Fn1 is not particularly limited, and for example is 1.0230.

In the present embodiment, Fn1 can be determined by the following method. First, in an X-ray diffraction profile obtained using CuKα radiation, a lattice spacing {111}γ of the {111} planes of the austenite phase and a lattice spacing {110}α' of the {110} planes of the martensite phase are determined. Specifically, a test specimen is prepared from the austenitic stainless steel foil according to the present embodiment. The size of the test specimen is not particularly limited, and the thickness of the test specimen is made the same as the thickness of the steel foil. The observation surface of the test specimen (surface of the steel foil) is measured by X-ray diffraction analysis (XRD) to obtain a diffraction profile. The XRD analysis is performed by using CuKα radiation as the radiation source, 40 kV as the tube voltage, and 40 mA as the tube current. Further, measurement is performed at a step of 0.01 degrees and a rate of 1°/min, with the diffraction angle (2θ) set to a range of 40 to 50 degrees. In addition, a focusing method is used as the measurement method.

The peak of the (111) plane of the austenite phase and the peak of the {110} plane of the martensite phase are identified from the obtained diffraction profile. The lattice spacing d (Å) for each of the (111) planes of the austenite phase and the {110} planes of the martensite phase can be determined by using the location (2θ) of each identified peak, and Bragg's equation (Equation (A)) that is described above.

$$d=\lambda/2 \sin \theta \quad (A)$$

Here, in Equation (A), the x-ray wavelength in Å is substituted for λ, and a value obtained by dividing the location of each peak by 2 is substituted in ° for θ.

Fn1 can be determined based on the obtained lattice spacing of the {111} planes of the austenite phase and the {110} planes of the martensite phase, and Formula (1). Note that, in the present embodiment, it suffices that Fn1 is 1.0220 or more, and the lattice spacing {111}γ of the {111} planes of the austenite phase and the lattice spacing {110}α' of the {110} planes of the martensite phase are not particularly limited. The lattice spacing {111}γ of the {111} planes of the austenite phase is, for example, 2.0730 to 2.0760 Å. The lattice spacing {110}α' of the {110} planes of the martensite phase is, for example, 2.0250 to 2.0350 Å.

[Thickness of Austenitic Stainless Steel Foil]

As described above, the term "steel foil" as used in the present description means a steel sheet that has a thickness of 100 μm or less. Therefore, the austenitic stainless steel foil according to the present embodiment is a foil band shape having a thickness of 100 μm or less, and is thus extremely thin. In short, the thickness of the austenitic stainless steel foil according to the present embodiment is 100 μm or less. Preferably, the thickness of the austenitic stainless steel foil according to the present embodiment is in the range of approximately 10 to 100 μm. In such a case, the austenitic stainless steel foil according to the present embodiment is suitable as an electronic equipment material that is required to have high fatigue strength.

[Fatigue Strength]

The austenitic stainless steel foil according to the present embodiment has the aforementioned chemical composition, and in the austenitic stainless steel foil, a full width at half maximum Fw of a peak of the {111} plane in an X-ray diffraction profile obtained using CuKα radiation is greater than 0.366°. As a result, the austenitic stainless steel foil according to the present embodiment has excellent fatigue strength. Here, in the present embodiment, the term "excellent fatigue strength" is defined as follows.

The austenitic stainless steel foil according to the present embodiment is subjected to a reverse bend test. Specifically, a test specimen is prepared from the austenitic stainless steel foil according to the present embodiment. The size of the test specimen is made, for example, 110 mm in the rolling direction of the steel foil, 100 mm in the width direction of the steel foil, and the same thickness as the thickness of the steel foil. A general-purpose reverse bend testing machine is used to subject the prepared test specimen to repeated bending stress until the test specimen ruptures. The direction in which the bending stress is applied is set to the direction perpendicular to the rolling direction of the steel foil. At this time, the bending period is set to 1.25 Hz, the bend radius is set to 2 mm, and the bending angle is set to 0 to 125°. The number of repeated bends until rupture is defined as the number of fatigue cycles. In a case where the number of fatigue cycles according to the aforementioned definition is $4.5 \times 10^4$ cycles or more, it is determined that the test specimen has excellent fatigue strength.

The austenitic stainless steel foil according to the present embodiment has the aforementioned chemical composition, and in the austenitic stainless steel foil, a full width at half maximum Fw of a peak of the {111} plane in an X-ray diffraction profile obtained using CuKα radiation is greater than 0.366°, and in addition, preferably the uniform strain e is made less than $-2.89 \times 10^{-4}$. As a result, the austenitic stainless steel foil according to the present embodiment has more excellent fatigue strength. Here, in the present embodiment, the term "excellent fatigue strength" is defined as follows.

A reverse bend test is conducted according to the method described above. If the number of fatigue cycles according to the above definition that is obtained as a result is $5.0 \times 10^4$ cycles or more, it is determined that the austenitic stainless steel foil has excellent fatigue strength.

[Durability with Respect to Bending Stress]

The austenitic stainless steel foil according to the present embodiment has the aforementioned chemical composition, and in the austenitic stainless steel foil, a full width at half maximum Fw of a peak of the {111} plane in an X-ray diffraction profile obtained using CuKα radiation is greater than 0.366°, and in addition, preferably Fn1 (={111}γ/{110}α') is made 1.0220 or more. In this case, the austenitic stainless steel foil has excellent fatigue strength, and furthermore, has excellent durability with respect to bending stress. Here, in the present embodiment, excellent durability is defined as follows.

The austenitic stainless steel foil according to the present embodiment is subjected to a reverse bend test. Specifically, a test specimen is prepared from the austenitic stainless steel foil according to the present embodiment. The size of the test specimen is made, for example, 110 mm in the rolling direction of the steel foil, 100 mm in the width direction of the steel foil, and the same thickness as the thickness of the steel foil. A general-purpose reverse bend testing machine is used to apply repeated bending stress to the prepared test specimen. The direction in which the bending stress is applied is set to the direction perpendicular to the rolling direction of the steel foil. At this time, the bending period is set to 1.25 Hz, the bend radius is set to 2.5 mm, and the bending angle is set to 0 to 125°.

Figure 3:
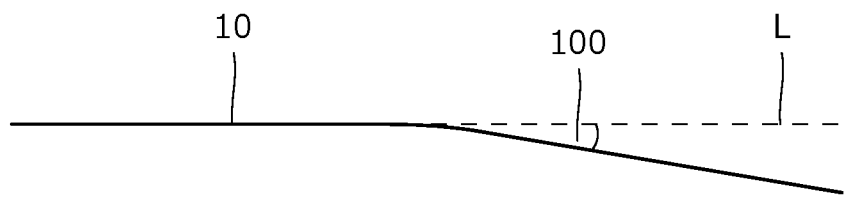
FIG. 3 is a schematic diagram for describing a method for measuring the residual bend angle illustrated in FIG. 2.

The number of times that repeated bending stress is applied is set to 20,000 times (twenty thousand times). A residual bend angle of the test specimen to which repeated bending stress has been applied twenty thousand times is defined in the following manner. The test specimen before the repeated bending stress application test is seen as a straight line in side view. FIG. 3 is a schematic diagram for describing a method for measuring the residual bend angle shown in FIG. 2. As illustrated in FIG. 3, when a test specimen 10 is seen in side view, an angle 100 that is formed by a bent portion of the test specimen 10 after the test and a straight line L is defined as a residual bend angle.

The residual bend angle, for example, is measured by the following method. The test specimen 10 after the test is left to stand in an upright position on a horizontal plate. After being left to stand, the residual bend angle is measured. Note that, in a case where the residual bend angle is small and the test specimen does not stand by itself, each of the two ends of the test specimen 10 may be sandwiched by plate members to an extent that the test specimen does not deform, to thereby make it easy for the test specimen 10 to be left to stand. In the austenitic stainless steel foil according to the present embodiment, if the residual bend angle defined as described above is 6.0° or less, it is determined that the austenitic stainless steel foil has excellent durability with respect to bending stress.

[Production Method]

One example of a method for producing the austenitic stainless steel foil according to the present embodiment having the aforementioned configuration is described hereunder. That is, a method for producing the austenitic stainless steel foil according to the present embodiment is not limited to the production method described hereunder.

One example of a method for producing the austenitic stainless steel foil according to the present embodiment includes an intermediate steel material preparation process, a first cold rolling process, a bright annealing process, a second cold rolling process, and a tension annealing process. Note that, the first cold rolling process and the bright annealing process may be repeatedly performed multiple times.

[Intermediate Steel Material Preparation Process]

In the intermediate steel material preparation process, an intermediate steel material having the aforementioned chemical composition is prepared. The term "intermediate steel material" refers to an intermediate product for producing the austenitic stainless steel foil according to the present embodiment, and refers to a steel sheet having a thickness ranging from several hundred μm to several mm. The intermediate steel material is, for example, a cold-rolled coil obtained by subjecting a hot-rolled coil to cold rolling. The intermediate steel material may be prepared by producing the intermediate steel material, or may be prepared by purchasing the intermediate starting material from a third party. That is, the process for preparing the intermediate steel material is not particularly limited.

In the case of producing the intermediate starting material, for example, the intermediate starting material is produced by the following method. A molten steel having the above-described chemical composition is produced. A cast piece (a slab, a bloom, or a billet) is produced by a continuous casting process using the molten steel. An ingot may be produced by an ingot-making process using the molten steel. As required, a slab, a bloom, or an ingot may be subjected to blooming to produce a billet.

The produced cast piece or ingot (slab, bloom, billet, or ingot) is subjected to hot working to produce a steel sheet having a thickness ranging from several hundred μm to several mm. The method for performing hot working is not particularly limited, and it suffices to use a well-known method. The hot working is, for example, hot rolling. In the case of producing the intermediate steel material by hot rolling, for example, the intermediate steel material can be produced by the following method.

After the produced cast piece or ingot is heated, rough rolling and finish rolling are performed. At this time, the hot rolling conditions are not particularly limited, and it suffices to appropriately set well-known conditions. As necessary, the hot-rolled intermediate steel material may be repeatedly subjected to cold rolling and an annealing treatment. The hot-rolled intermediate steel material may, as necessary, also be subjected to skin pass rolling. In addition, as necessary, the hot-rolled intermediate steel material may be subjected to an annealing treatment. The intermediate steel material according to the present embodiment is prepared by the above process.

[First Cold Rolling Process]

In the first cold rolling process, the intermediate steel material prepared in the aforementioned intermediate steel material preparation process is subjected to cold rolling. In the present example, the cold rolling in the first cold rolling can be performed using a well-known apparatus. For example, a continuous mill that is equipped with a plurality of cold rolling stands may be used.

In the first cold rolling process according to the present embodiment, preferably a cold rolling rate CR1 is 45% or more. Here, the term "cold rolling rate CR1(%)" means the rate of reduction (%) in the thickness of the intermediate steel material after completing the first cold rolling process relative to the thickness thereof before starting the first cold rolling process. That is, the cold rolling rate CR1 in the first cold rolling process is defined by the following Equation (C).

$$CR1(\%)=100-(\text{thickness of intermediate steel material after first cold rolling process})/(\text{thickness of intermediate steel material before first cold rolling process})\times 100 \qquad (C)$$

If the cold rolling rate CR1 in the first cold rolling process is too low, introduced dislocations will decrease in the microstructure of the intermediate steel material. As a result, in the produced austenitic stainless steel foil, it may not be possible to sufficiently increase the full width at half maximum Fw of a peak of the {111} plane in an X-ray diffraction profile obtained using CuKα radiation. In addition, if the cold rolling rate CR1 is too low, the applied compressive strain will decrease in the crystal lattice of the intermediate steel material. As a result, in some cases the uniform strain e in the produced austenitic stainless steel foil cannot be sufficiently lowered. Furthermore, if the cold rolling rate CR1 is too low, the strain applied to the austenite phase will decrease. As a result, in the produced austenitic stainless steel foil, it may not be possible to sufficiently increase Fn1.

Therefore, in the first cold rolling process of the present embodiment, preferably the cold rolling rate CR1 is made 45% or more. A more preferable lower limit of the cold rolling rate CR1 in the first cold rolling process is 47%, and further preferably is 50%. The upper limit of the cold rolling rate CR1 in the first cold rolling process is not particularly limited, and for example is 75%.

[Bright Annealing Process]

In the bright annealing process, the intermediate steel material cold-rolled in the aforementioned first cold rolling process is subjected to a bright annealing treatment. The term "bright annealing treatment" refers to an annealing treatment under a very low oxygen atmosphere. Because the bright annealing treatment is performed under a very low oxygen atmosphere, the surface of the intermediate steel material subjected to the bright annealing treatment is hardly oxidized by the treatment, and the surface gloss can be maintained.

A preferable annealing temperature in the bright annealing process is 900 to 1200° C. If the annealing temperature is too low, the constituent elements will be unevenly distributed, and recrystallization will also not occur, resulting in an inhomogeneous microstructure. As a result, in the produced austenitic stainless steel foil, in some cases the full width at half maximum Fw of the {111} plane may decrease, and the fatigue strength may decrease. If the annealing temperature is too low, in addition, the constituent elements will be unevenly distributed, and recrystallization will also not occur, resulting in an inhomogeneous microstructure. As a result, in some cases it may not be possible to sufficiently reduce the uniform strain e in the produced austenitic stainless steel foil.

On the other hand, if the annealing temperature is too high, in some cases, as a result of the grains coarsening, the full width at half maximum Fw of the {111} plane may decrease, and the fatigue strength of the produced austenitic stainless steel foil may decrease. Therefore, in the bright annealing process of the present embodiment, preferably the annealing temperature is set within the range of 900 to 1200° C. A more preferable lower limit of the annealing temperature in the bright annealing process is 920° C. A more preferable upper limit of the annealing temperature in the bright annealing process is 1180° C.

A preferable annealing time in the bright annealing process is 5 to 10 seconds. If the annealing time is too short, the inherent stress cannot be sufficiently relieved, resulting in an inhomogeneous microstructure. As a result, in the produced austenitic stainless steel foil, in some cases the full width at half maximum Fw of the {111} plane may decrease, and the fatigue strength may decrease. In addition, as a result, it may not be possible to sufficiently reduce the uniform strain e in the produced austenitic stainless steel foil.

On the other hand, if the annealing time is too long, in some cases, as a result of the grains coarsening, the full width at half maximum Fw of the {111} plane may decrease, and the fatigue strength of the produced austenitic stainless steel foil may decrease. Therefore, in the bright annealing process of the present embodiment, preferably the annealing time is set in the range of 5 to 10 seconds. Note that, in the present description, the term "annealing temperature" of the bright annealing means the temperature (° C.) of the heat treatment furnace for performing the annealing treatment. Note that, in the present description, the term "annealing time" of the bright annealing means the time (seconds) taken for the intermediate steel material to pass through the heat treatment furnace in order to perform the annealing treatment.

In the bright annealing process, preferably the atmosphere is made an atmospheric gas composed of a gaseous mixture of $H_2$ gas and $N_2$ gas. In this case, preferably an $N_2$ fraction in the atmospheric gas is within the range of 35 to 65% in volume ratio. If the $N_2$ fraction in the atmospheric gas is too low, the production cost will significantly increase. On the other hand, if the $N_2$ fraction in the atmospheric gas is too high, Cr nitride precipitation may be promoted in the outer layer of the steel material. In such a case, Cr nitrides will remain in the produced austenitic stainless steel foil also. Consequently, in the parent phase of the austenitic stainless steel foil, an effect of locking dislocations by means of dissolved Cr will decrease due to a decrease in the Cr concentration. As a result, the dislocation density in the outer layer of the produced austenitic stainless steel foil will decrease, and the full width at half maximum Fw of the {111} plane will decrease and the fatigue strength will be lowered. Therefore, in the bright annealing process according to the present embodiment, preferably the atmospheric gas is a gaseous mixture containing 35 to 65% by volume of $N_2$ gas, with the balance being $H_2$ gas.

In the bright annealing process, the dew point of the atmospheric gas is not particularly limited. However, when seeking to obtain the austenitic stainless steel foil having more excellent fatigue strength, preferably the dew point of the atmospheric gas is made less than −73° C. If the dew point of the atmospheric gas is high, Cr nitrides will easily precipitate in the intermediate steel material during the bright annealing. As a result, in some cases Cr nitrides may remain in the produced austenitic stainless steel foil also. In such a case, there is a possibility that, due to the Cr concentration in the parent phase of the austenitic stainless steel foil decreasing, the lattice spacing d0 will decrease and the uniform strain e will be high. Furthermore, if the dew point of the atmospheric gas is too high, a thick oxide film may be formed at the outer layer of the intermediate steel material. In such a case, the quality of the appearance of the produced austenitic stainless steel foil will decrease. Furthermore, in this case, in the second cold rolling process to be described later, in some cases surface defects may form and serve as an origin for rupture during repeated bending.

On the other hand, if the dew point of the atmospheric gas is made less than −73° C., precipitation of Cr nitrides can be stably suppressed, and the uniform strain e of the austenitic stainless steel foil can be reduced. In this case, furthermore, formation of a thick oxide film can be suppressed, and a decrease in the quality of the appearance as well as the formation of surface defects can be prevented. Therefore, when seeking to obtain an austenitic stainless steel foil that has more excellent fatigue strength, preferably the dew point of the atmospheric gas is made less than −73° C.

In the bright annealing process, the furnace pressure is not particularly limited. However, when seeking to obtain an austenitic stainless steel foil that also has excellent durability, preferably the furnace pressure is made 100 to 800 Pa. In the present description, the term "furnace pressure" refers to the difference between the pressure inside the furnace and the atmospheric pressure. That is, the phrase "the furnace pressure in the bright annealing process is 100 to 800 Pa" means that the pressure inside the furnace during the bright annealing process is 100 to 800 Pa higher than the atmospheric pressure. If the furnace pressure is too low, when introducing the intermediate steel material into the furnace, atmospheric air will also be easily introduced into the furnace. Consequently, in some cases the atmosphere inside the furnace may change, and the fatigue strength of the produced austenitic stainless steel foil may decrease.

On the other hand, if the furnace pressure is too high, nitrogen originating from the atmosphere inside the furnace may be excessively introduced into the outer layer of the intermediate steel material, and nitrides may be formed in the outer layer. In such a case, the solute nitrogen content in the intermediate steel material will, on the contrary, decrease, and the lattice spacing of the austenite phase will decrease. As a result, there is a possibility that Fn1 will not be sufficiently increased in the produced austenitic stainless steel foil. Therefore, when seeking to obtain an austenitic stainless steel foil that also has excellent durability, in the bright annealing process of the present embodiment, preferably the furnace pressure is made to fall within the range of 100 to 800 Pa.

Note that, as described above, the first cold rolling process and the bright annealing process may be repeatedly performed a plurality of times. For example, in a case of repeatedly performing the first cold rolling and the bright annealing two times, a first first cold rolling and a first bright annealing are performed, and thereafter a second first cold rolling and a second bright annealing are performed. Even in this case, preferably the first cold rolling and the bright annealing are each performed under the conditions described above.

[Second Cold Rolling Process]

In the second cold rolling process, the intermediate steel material subjected to a bright annealing treatment in the aforementioned bright annealing process is subjected to a second cold rolling. Similarly to the cold rolling in the first cold rolling process, the cold rolling in the second cold rolling process can also be performed using a well-known apparatus. For example, a continuous mill that is equipped with a plurality of cold rolling stands may be used.

In the second cold rolling process according to the present embodiment, preferably a cold rolling rate CR2 is 45% or more. Here, the term "cold rolling rate CR2(%)" means the rate of reduction (%) in the thickness of the intermediate steel material after completing the second cold rolling process relative to the thickness thereof before starting the second cold rolling process. That is, the cold rolling rate CR2 in the second cold rolling process is defined by the following Equation (D).

$$CR2(\%)=100-(\text{thickness of intermediate steel material after second cold rolling process})/(\text{thickness of intermediate steel material before second cold rolling process})\times 100 \qquad (D)$$

If the cold rolling rate CR2 in the second cold rolling process is too low, introduced dislocations will decrease in the microstructure of the intermediate steel material. As a result, in the produced austenitic stainless steel foil, it may not be possible to sufficiently increase the full width at half maximum Fw of a peak of the {111} plane in an X-ray diffraction profile obtained using CuKα radiation. In addition, if the cold rolling rate CR2 is too low, the applied compressive strain will decrease in the crystal lattice of the intermediate steel material. As a result, in some cases it may not be possible to sufficiently lower the uniform strain e in the produced austenitic stainless steel foil. Furthermore, if the cold rolling rate CR2 is too low, the strain applied to the austenite phase will decrease. As a result, in the produced austenitic stainless steel foil, it may not be possible to sufficiently increase Fn1.

Therefore, in the second cold rolling process of the present embodiment, preferably the cold rolling rate CR2 is made 45% or more. A more preferable lower limit of the cold rolling rate CR2 in the second cold rolling process is 47%, and further preferably is 50%. The upper limit of the cold rolling rate CR2 in the second cold rolling process is not particularly limited, and for example is 75%.

[Tension Annealing Process]

In the tension annealing process, the intermediate steel material subjected to cold rolling in the aforementioned second cold rolling process is subjected to tension annealing. The term "tension annealing" refers to performing an annealing treatment while applying tension. The flatness of the intermediate steel material on which tension annealing is performed can be maintained by the tension.

A preferable annealing temperature in the tension annealing process is in the range of 350 to 850° C. If the annealing temperature is too low, in some cases sufficient strain ageing cannot be obtained. On the other hand, if the annealing temperature is too high, in the microstructure of the intermediate steel material, the introduced dislocation density will decrease too much. As a result, in the produced austenitic stainless steel foil, it may not be possible to sufficiently increase the full width at half maximum Fw of a peak of the {111} plane in an X-ray diffraction profile obtained using CuKα radiation.

Therefore, in the tension annealing process of the present embodiment, preferably the annealing temperature is set within the range of 350 to 850° C. A more preferable lower limit of the annealing temperature in the tension annealing process is 360° C. A more preferable upper limit of the annealing temperature in the tension annealing process is 800° C.

In the tension annealing process, the annealing time is not particularly limited. The annealing time is, for example, 5 to 10 seconds. Note that, in the present description, the term "annealing temperature" of the tension annealing refers to the temperature (° C.) of the heat treatment furnace used to perform the annealing treatment. Note that, in the present description, the term "annealing time" of the tension annealing refers to the time (seconds) taken for the intermediate steel material to pass through the heat treatment furnace to perform the annealing treatment.

A preferable tension in the tension annealing process is 2.0 to 6.0 N/mm². If the tension applied to the intermediate steel material is too low, the flatness of the austenitic stainless steel foil may decrease. On the other hand, if the tension is too high, the introduced dislocation density will decrease too much. As a result, in the produced austenitic stainless steel foil, it may not be possible to sufficiently increase the full width at half maximum Fw of a peak of the {111} plane in an X-ray diffraction profile obtained using CuKα radiation. Therefore, in the tension annealing process of the present embodiment, the applied tension is preferably set within the range of 2.0 to 6.0 N/mm². A more preferable lower limit of the tension in the tension annealing process is 3.0 N/mm². A more preferable upper limit of the tension in the tension annealing process is 5.0 N/mm².

In this way, the intermediate steel material preparation process, the first cold rolling process, the bright annealing process, the second cold rolling process, and the tension annealing process are performed. Here, the full width at half maximum Fw of a peak of the {111} plane in an X-ray diffraction profile obtained using CuKα radiation is strongly influenced by the first cold rolling process, the bright annealing process, and the second cold rolling process, and the value thereof changes. That is, a value of the full width at half maximum Fw of the {111} plane changes depending on the balance between the first cold rolling process, the bright annealing process, and the second cold rolling process.

Therefore, in the production method according to the present embodiment, by the conditions in the first cold rolling process, the bright annealing process, and the second cold rolling process satisfying the following Formula (2), an austenitic stainless steel foil having the aforementioned chemical composition and having a full width at half maximum Fw of the {111} plane that is greater than 0.366° can be stably produced.

$$\left| \log_{10}\left( Eq1 \times Eq2 \times \frac{Eq3}{Eq4} \times \frac{Eq5}{Eq6} \right) \right| \leq 0.80 \qquad (2)$$

Here, Eq1, Eq2, Eq3, Eq4, Eq5, and Eq6 in Formula (2) are defined by the following Formulae (3) to (8).

$$Eq1 = \exp\left\{ -1 \times \left( \frac{CR1 - 62.824}{12.314} \right)^2 \right\} \qquad (3)$$

$$Eq2 = \exp\left\{ -1 \times \left( \frac{CR2 - 62.824}{12.314} \right)^2 \right\} \qquad (4)$$

$$Eq3 = \exp\left\{ -1 \times \left( \frac{LM - 27963}{3227.9} \right)^2 \right\} \qquad (5)$$

$$Eq4 = 0.8895 + \frac{156800}{(LM - 29434)^2 + 1313000} \qquad (6)$$

$$Eq5 = \exp\left\{ -1 \times \left( \frac{T_T - 632}{267} \right)^2 \right\} \qquad (7)$$

$$Eq6 = \frac{\exp\left\{ -1 \times \left( \frac{F_T - 3.4061}{2.15} \right)^2 \right\}}{2} \qquad (8)$$

Here, the cold rolling rate in the first cold rolling process is substituted in % for CR1 in Formula (3). The cold rolling rate in the second cold rolling process is substituted in % for CR2 in Formula (4). LM in Formulae (5) and (6) is defined by the following Formula (9). The annealing temperature in the tension annealing process is substituted in ° C. for TT in Formula (7). The tension in the tension annealing process is substituted in N/mm² for FT in Formula (8).

$$LM = (T+273) \times \{24 + \log_{10}(t)\} \qquad (9)$$

Here, in Formula (9), the annealing temperature in the bright annealing process is substituted in ° C. for T, and the annealing time in the bright annealing process is substituted in hour for t.

Let the left side of Formula (2) be defined as "FnA". In the production method according to the present embodiment, FnA is an index of conditions that increase the full width at half maximum Fw of the {111} plane in an X-ray diffraction profile obtained using CuKα radiation. In the production method according to the present embodiment, if the aforementioned conditions are satisfied and, furthermore, FnA is 0.80 or less, an austenitic stainless steel foil having the aforementioned chemical composition and having a full width at half maximum Fw of the {111} plane that is greater than 0.366° in an X-ray diffraction profile obtained using CuKα radiation can be stably produced. Therefore, in the production method according to the present embodiment, preferably FnA is made 0.80 or less.

In addition, the uniform strain e is strongly influenced by the first cold rolling process, the bright annealing process, and the second cold rolling process, and the value thereof changes accordingly. That is, the value of the uniform strain e changes depending on the balance between the first cold rolling process, the bright annealing process, and the second cold rolling process. Therefore, when seeking to obtain an austenitic stainless steel foil having more excellent fatigue strength, in addition to the conditions described above, preferably the conditions of the first cold rolling process, the bright annealing process, and the second cold rolling process satisfy the following Formula (10). In this case, an austenitic stainless steel foil having the aforementioned chemical composition and a full width at half maximum Fw of the {111} plane that is greater than 0.366° in an X-ray diffraction profile obtained using CuKα radiation, and also having a uniform strain e that is less than $-2.89 \times 10^{-4}$ can be stably produced.

$$0.15 \leq Eq1 \times Eq2 \times \frac{Eq7}{Eq3^2} \leq 1.00 \qquad (10)$$

Here, Eq1, Eq2, and Eq3 in Formula (10) are defined by the above Formulae (3) to (5). Eq7 in Formula (10) is defined by the following Formula (11).

$$Eq7 = -5.1921 + \frac{6.4772}{1 + \exp\left(-\frac{Eq3 + 0.35177}{0.45658}\right)} \quad (11)$$

Let the middle portion in Formula (10) be defined as "FnB". In the production method according to the present embodiment, FnB is an index of conditions that stably lower the uniform strain. In the production method according to the present embodiment, if the aforementioned conditions are satisfied and, in addition, FnB is within the range of 0.15 to 1.00, an austenitic stainless steel foil having the aforementioned chemical composition, having a full width at half maximum Fw of the {111} plane that is greater than 0.366° in an X-ray diffraction profile obtained using CuKα radiation, and furthermore, having a uniform strain e that is less than $-2.89 \times 10^{-4}$ can be stably produced. Therefore, in the production method according to the present embodiment, preferably FnB is made to fall within the range of 0.15 to 1.00.

In addition, Fn1 is strongly influenced by the first cold rolling process, the bright annealing process, and the second cold rolling process, and the value thereof changes accordingly. That is, the value of Fn1 changes depending on the balance between the first cold rolling process, the bright annealing process, and the second cold rolling process. Therefore, when seeking to obtain an austenitic stainless steel foil having excellent durability, in addition to the conditions described above, preferably the conditions of the first cold rolling process, the bright annealing process, and the second cold rolling process satisfy the following Formula (12). In this case, an austenitic stainless steel foil having the aforementioned chemical composition and a full width at half maximum Fw of the {111} plane that is greater than 0.366° in an X-ray diffraction profile obtained using CuKα radiation, and also having an Fn1 value of 1.0220 or more can be stably produced.

$$\left|\log_{10}\left(Eq1 \times Eq2 \times \frac{Eq3}{Eq4} \times Eq5 \times Eq8\right)\right| \leq 1.70 \quad (12)$$

Here, Eq1, Eq2, Eq3, Eq4, and Eq5 in Formula (12) are defined by the above Formulae (3) to (7). Eq8 in Formula (12) is defined by the following Formula (13).

$$Eq8 = -0.89454 + \frac{486470}{(P - 450)^2 + 251870} \quad (13)$$

Here, the furnace pressure in the bright annealing process is substituted in Pa for P in Formula (13).

Let the left side in Formula (13) be defined as "FnC". In the production method of the present embodiment, FnC is an index of conditions that can increase a ratio (Fn1={111}γ/{110}α') of the lattice spacing {111}γ of the {111} planes of the austenite phase to the lattice spacing {110}α' of the {110} planes of the martensite phase in an X-ray diffraction profile obtained using CuKα radiation. In the present embodiment, if the aforementioned conditions are satisfied and, in addition, FnC is 1.70 or less, an austenitic stainless steel foil having the aforementioned chemical composition and a full width at half maximum Fw of the {111} plane that is greater than 0.366° in an X-ray diffraction profile obtained using CuKα radiation, and furthermore, in which Fn1 is 1.0220 or more can be stably produced. Therefore, in the production method according to the present embodiment, preferably FnC is made 1.70 or less.

The austenitic stainless steel foil according to the present embodiment can be produced by the processes described above. Note that, the production method described above is one example of a method for producing the austenitic stainless steel foil according to the present embodiment. That is, a method for producing the austenitic stainless steel foil according to the present embodiment is not limited to the production method described above, and may be a different production method.

The austenitic stainless steel foil according to the present embodiment is described more specifically hereunder by way of examples. Note that, each of the examples described hereunder is one example for verifying the advantageous effects of the austenitic stainless steel foil according to the present embodiment, and the following examples are not intended to limit the present invention.

Example 1

Slabs were produced by continuous casting from molten steels having the chemical compositions shown in Table 1. Note that, the symbol "-" in Table 1 means that the value was 0% when the fraction of the corresponding numerical value described in Table 1 was rounded off.

TABLE 1

| | Chemical Composition (unit is mass %; balance is Fe and impurities) | | | | | | | | |
|---|---|---|---|---|---|---|---|---|---|
| Steel | C | Si | Mn | P | S | Cr | Ni | N | Other |
| A | 0.100 | 0.47 | 0.57 | 0.029 | 0.0030 | 16.51 | 6.64 | 0.030 | — |
| B | 0.120 | 0.57 | 0.64 | 0.030 | 0.0030 | 16.59 | 6.74 | 0.010 | Mo: 0.20, Co: 0.25 |
| C | 0.060 | 0.42 | 0.85 | 0.031 | 0.0010 | 18.12 | 9.09 | 0.040 | B: 0.0004, Ca: 0.0007, Mg: 0.0100 |
| D | 0.060 | 0.52 | 0.90 | 0.034 | 0.0020 | 18.20 | 9.11 | 0.050 | Al: 0.007 |
| E | 0.060 | 0.41 | 0.84 | 0.030 | 0.0009 | 18.05 | 9.00 | 0.030 | Cu: 0.28 |
| F | 0.110 | 0.46 | 0.57 | 0.030 | 0.0028 | 16.49 | 6.63 | 0.010 | Nb: 0.03, Mo: 0.40, V: 0.50, Ta: 0.50, B: 0.0005, Ca: 0.0020, REM: 0.0010 |
| G | 0.110 | 0.45 | 0.58 | 0.028 | 0.0028 | 16.50 | 6.65 | 0.008 | Mo: 0.10, Hf: 0.05, Co: 0.20, Al: 0.080, Ti: 0.100, Zr: 0.020 |
| H | 0.090 | 0.46 | 0.56 | 0.030 | 0.0028 | 16.51 | 6.63 | 0.040 | Mo: 0.10, Nb: 0.05, Cu: 0.25 |
| I | 0.060 | 0.42 | 0.83 | 0.030 | 0.0009 | 18.06 | 9.00 | 0.030 | B: 0.0008, Ca: 0.0040, Ti: 0.005 |
| J | 0.061 | 0.41 | 0.81 | 0.028 | 0.0008 | 18.10 | 9.01 | 0.040 | B: 0.0003, Cu: 1.50 |
| K | 0.060 | 0.40 | 0.78 | 0.029 | 0.0009 | 18.20 | 8.98 | 0.040 | Al: 0.008, Cu: 3.00 |
| L | 0.100 | 0.45 | 0.59 | 0.025 | 0.0025 | 16.52 | 6.60 | 0.050 | B: 0.0008, Al: 0.005, Cu: 0.10 |

The slabs of steels A to L were subjected to hot rolling and annealing to produce hot-rolled coils having a thickness of 4 mm. Cold rolling and annealing were repeatedly performed on the produced hot-rolled coils of the steels A to L to thereby produce intermediate steel materials (cold-rolled coils) in a foil band shape having a thickness of 300 μm.

With respect to Test Numbers 1-1 to 1-21, a first cold rolling was performed under the conditions described in Table 2 using the intermediate steel materials of the steels A to L. Specifically, the intermediate steel materials of Test Numbers 1-1 to 1-21 were repeatedly subjected to a first cold rolling and bright annealing for the number of times described in Table 2. More specifically, if "1 time" is described in Table 2, it means that the first cold rolling and the bright annealing were each performed one time. If "2 times" is described in Table 2, it means that a combination of the first cold rolling and the bright annealing was repeated two times.

steel materials of Test Numbers 1-1 to 1-21 is shown in Table 2. The intermediate steel materials on which the second cold rolling had been performed were subjected to tension annealing. The annealing temperature (° C.) in the tension annealing performed on the intermediate steel materials of Test Numbers 1-1 to 1-21 is shown in Table 2. In addition, the tension (N/mm$^2$) in the tension annealing performed on the intermediate steel materials of Test Numbers 1-1 to 1-21 is shown in Table 2.

In addition, with respect to Test Numbers 1-1 to 1-21, Eq1, Eq2, Eq3, Eq4, Eq5, Eq6, LM, and FnA were determined using the conditions of the first cold rolling, the bright annealing, the second cold rolling, and the tension annealing, and the above Formulae (2) to (9). The determined FnA is shown in Table 2. The determined Eq1, Eq2, Eq3, Eq4, Eq5, Eq6, LM, and FnA are shown in Table 3.

TABLE 2

| Test Number | Steel | First Cold Rolling Number of Cycles (times) | First Cold Rolling CR1 (%) | Bright Annealing Annealing Temperature (° C.) | Bright Annealing Annealing Time (secs) | Bright Annealing N$_2$ Fraction (%) | Second Cold Rolling CR2 (%) | Tension Annealing Annealing Temperature (° C.) | Tension Annealing Tension (N/mm$^2$) | FnA | Full width at half maximum Fw (°) | Number of Fatigue Cycles (×10$^4$ times) |
|---|---|---|---|---|---|---|---|---|---|---|---|---|
| 1-1 | A | 1 | 56 | 1100 | 5 | 45 | 75 | 350 | 5.0 | 0.55 | 0.591 | 51.0 |
| 1-2 | B | 1 | 60 | 900 | 10 | 50 | 52 | 350 | 4.0 | 0.79 | 0.375 | 7.0 |
| 1-3 | C | 1 | 70 | 1000 | 5 | 50 | 55 | 400 | 2.0 | 0.17 | 0.523 | 37.0 |
| 1-4 | D | 1 | 70 | 950 | 10 | 50 | 50 | 450 | 5.0 | 0.36 | 0.511 | 35.0 |
| 1-5 | E | 1 | 56 | 1100 | 5 | 50 | 50 | 500 | 5.0 | 0.22 | 0.475 | 30.0 |
| 1-6 | F | 1 | 75 | 1100 | 10 | 50 | 55 | 550 | 5.0 | 0.20 | 0.550 | 45.0 |
| 1-7 | G | 1 | 56 | 1100 | 5 | 50 | 50 | 600 | 6.0 | 0.28 | 0.463 | 25.0 |
| 1-8 | A | 1 | 56 | 1100 | 5 | 50 | 50 | 650 | 6.0 | 0.28 | 0.426 | 17.0 |
| 1-9 | H | 1 | 56 | 1100 | 5 | 50 | 50 | 700 | 5.0 | 0.14 | 0.413 | 19.0 |
| 1-10 | I | 1 | 56 | 1150 | 5 | 50 | 50 | 750 | 5.0 | 0.33 | 0.388 | 10.0 |
| 1-11 | J | 2 | 56 | 1100 | 5 | 50 | 50 | 800 | 5.0 | 0.28 | 0.396 | 12.0 |
| 1-12 | K | 2 | 60 | 1200 | 5 | 55 | 52 | 850 | 3.0 | 0.72 | 0.530 | 39.0 |
| 1-13 | L | 1 | 75 | 1100 | 5 | 50 | 56 | 500 | 5.0 | 0.17 | 0.535 | 41.0 |
| 1-14 | A | 2 | 40 | 1100 | 5 | 50 | 50 | 650 | 5.0 | 1.47 | 0.180 | 1.0 |
| 1-15 | A | 1 | 56 | 1300 | 5 | 50 | 50 | 650 | 5.0 | 1.19 | 0.230 | 2.0 |
| 1-16 | A | 1 | 56 | 800 | 1 | 50 | 50 | 650 | 5.0 | 1.53 | 0.280 | 2.5 |
| 1-17 | A | 1 | 56 | 1100 | 10 | 50 | 40 | 650 | 5.0 | 1.18 | 0.300 | 2.8 |
| 1-18 | A | 1 | 45 | 1100 | 5 | 50 | 50 | 650 | 15.0 | 11.50 | 0.250 | 3.0 |
| 1-19 | A | 1 | 45 | 1100 | 5 | 50 | 50 | 900 | 10.0 | 2.52 | 0.300 | 1.5 |
| 1-20 | A | 1 | 50 | 1200 | 10 | 50 | 50 | 700 | 8.0 | 0.80 | 0.250 | 2.5 |
| 1-21 | A | 1 | 50 | 1100 | 5 | 50 | 50 | 820 | 3.0 | 0.89 | 0.340 | 4.2 |

The cold rolling rate CR1(%) of the first cold rolling performed on the intermediate steel materials of Test Numbers 1-1 to 1-21 is shown in Table 2. Note that, with respect to the intermediate steel materials of Test Numbers 1-11, 1-12, and 1-14 on which the first cold rolling was performed two times, the cold rolling rate CR1 of the first cold rolling was the same cold rolling rate for each of the two times. Bright annealing was performed on the intermediate steel materials of Test Numbers 1-1 to 1-21 on which the first cold rolling had been performed. The annealing temperature (° C.) and annealing time (secs) of the bright annealing performed on the intermediate steel materials of Test Numbers 1-1 to 1-21 are shown in Table 2. In addition, the N$_2$ fraction (%) in the atmospheric gas used when performing the bright annealing is shown in Table 2.

A second cold rolling was performed on the intermediate steel materials of Test Numbers 1-1 to 1-21 on which bright annealing had been performed. The cold rolling rate CR2(%) of the second cold rolling performed on the intermediate

TABLE 3

| Test Number | Eq1 | Eq2 | Eq3 | Eq4 | Eq5 | Eq6 | LM | FnA |
|---|---|---|---|---|---|---|---|---|
| 1-1 | 0.74 | 0.38 | 0.90 | 1.00 | 0.33 | 0.29 | 29029 | 0.55 |
| 1-2 | 0.95 | 0.46 | 0.47 | 0.90 | 0.33 | 0.46 | 25153 | 0.79 |
| 1-3 | 0.71 | 0.67 | 0.90 | 0.91 | 0.47 | 0.33 | 26915 | 0.17 |
| 1-4 | 0.71 | 0.34 | 0.75 | 0.90 | 0.63 | 0.29 | 26226 | 0.36 |
| 1-5 | 0.74 | 0.34 | 0.90 | 1.00 | 0.78 | 0.29 | 29029 | 0.22 |
| 1-6 | 0.38 | 0.67 | 0.81 | 1.01 | 0.91 | 0.29 | 29442 | 0.20 |
| 1-7 | 0.74 | 0.34 | 0.90 | 1.00 | 0.99 | 0.12 | 29029 | 0.28 |
| 1-8 | 0.74 | 0.34 | 0.90 | 1.00 | 1.00 | 0.12 | 29029 | 0.28 |
| 1-9 | 0.74 | 0.34 | 0.90 | 1.00 | 0.94 | 0.29 | 29029 | 0.14 |
| 1-10 | 0.74 | 0.34 | 0.65 | 0.98 | 0.82 | 0.29 | 30086 | 0.33 |
| 1-11 | 0.74 | 0.34 | 0.90 | 1.00 | 0.67 | 0.29 | 29029 | 0.28 |
| 1-12 | 0.95 | 0.46 | 0.38 | 0.93 | 0.51 | 0.48 | 31143 | 0.72 |
| 1-13 | 0.38 | 0.74 | 0.90 | 1.00 | 0.78 | 0.29 | 29029 | 0.17 |
| 1-14 | 0.03 | 0.34 | 0.90 | 1.00 | 1.00 | 0.29 | 29029 | 1.47 |
| 1-15 | 0.74 | 0.34 | 0.07 | 0.90 | 1.00 | 0.29 | 33257 | 1.19 |
| 1-16 | 0.74 | 0.34 | 0.03 | 0.89 | 1.00 | 0.29 | 21936 | 1.53 |
| 1-17 | 0.74 | 0.03 | 0.81 | 1.01 | 1.00 | 0.29 | 29442 | 1.18 |

TABLE 3-continued

| Test Number | Eq1 | Eq2 | Eq3 | Eq4 | Eq5 | Eq6 | LM | FnA |
|---|---|---|---|---|---|---|---|---|
| 1-18 | 0.12 | 0.34 | 0.90 | 1.00 | 1.00 | 0.00 | 29029 | 11.50 |
| 1-19 | 0.12 | 0.34 | 0.90 | 1.00 | 0.37 | 0.00 | 29029 | 2.52 |
| 1-20 | 0.34 | 0.34 | 0.28 | 0.92 | 0.94 | 0.01 | 31587 | 0.80 |
| 1-21 | 0.34 | 0.34 | 0.90 | 1.00 | 0.61 | 0.48 | 29029 | 0.89 |

[Evaluation Tests]

A full width at half maximum Fw measurement test and a reverse bend test were performed on the austenitic stainless steel foils of Test Numbers 1-1 to 1-21.

[Full Width at Half Maximum Fw Measurement Test]

The full width at half maximum Fw of the {111} plane under the conditions described above was determined with respect to the austenitic stainless steel foils of Test Numbers 1-1 to 1-21. Specifically, a test specimen was prepared from the austenitic stainless steel foil of each test number, and a diffraction profile was obtained by XRD. In the XRD, CuKα radiation was used as the radiation source, the tube voltage was set to 45 kV, and the tube current was set to 200 mA. Further, measurement was performed by a focusing method in which the diffraction angle (2θ) was set to a range of 40 to 50 degrees, at a step of 0.01 degrees, and a rate of 1°/min. The peak of the {111} plane was identified from the obtained diffraction profile, and the full width at half maximum Fw was determined. The determined full width at half maximum Fw (°) of the {111} plane is shown in Table 2.

[Reverse Bend Test]

The austenitic stainless steel foils of Test Numbers 1-1 to 1-21 were subjected to a reverse bend test under the aforementioned conditions. Specifically, a test specimen was prepared from the austenitic stainless steel foil of each test number, and a reverse bend test was performed. The size of the test specimen was made 110 mm in the rolling direction of the steel foil, 100 mm in the width direction, and the same thickness as the thickness of the steel foil. Repeated bending stress was applied to the test specimen in a direction perpendicular to the rolling direction. The bending period was set to 1.25 Hz, the bend radius was set to 2 mm, and the bending angle was set to 0 to 125°. The number of times that bending stress was applied until the test specimen ruptured was defined as the "number of fatigue cycles". The obtained number of fatigue cycles (times) is shown in Table 2.

[Evaluation Results]

Referring to Table 1 and Table 2, in the austenitic stainless steel foils of Test Numbers 1-1 to 1-13, all the ranges of the chemical composition of the present embodiment were satisfied, and in addition, in the production method, the cold rolling rate CR1 in the first cold rolling, the annealing temperature, annealing time, and $N_2$ fraction in the bright annealing, the cold rolling rate CR2 in the second cold rolling, the annealing temperature and tension in the tension annealing, and FnA all satisfied the preferable ranges described in the present description. As a result, the full width at half maximum Fw of a peak of the {111} plane in an X-ray diffraction profile obtained using CuKα radiation was greater than 0.366°. As a result, the number of fatigue cycles in the reverse bend test was more than $4.5 \times 10^{-4}$ times, and thus the austenitic stainless steel foils each had excellent fatigue strength.

On the other hand, with respect to the austenitic stainless steel foil of Test Number 1-14, in the production process, the cold rolling rate CR1 in the first cold rolling was too low, and in addition, FnA was more than 0.80. As a result, the full width at half maximum Fw of a peak of the {111} plane in an X-ray diffraction profile obtained using CuKα radiation was 0.366° or less. As a result, the number of fatigue cycles in the reverse bend test was less than $4.5 \times 10^{-4}$ times, and thus the austenitic stainless steel foil did not have excellent fatigue strength.

With respect to the austenitic stainless steel foil of Test Number 1-15, in the production process, the annealing temperature in the bright annealing was too high, and in addition, FnA was more than 0.80. As a result, the full width at half maximum Fw of a peak of the {111} plane in an X-ray diffraction profile obtained using CuKα radiation was 0.366° or less. As a result, the number of fatigue cycles in the reverse bend test was less than $4.5 \times 10^{-4}$ times, and thus the austenitic stainless steel foil did not have excellent fatigue strength.

With respect to the austenitic stainless steel foil of Test Number 1-16, in the production process, the annealing time in the bright annealing was too short, and in addition, FnA was more than 0.80. As a result, the full width at half maximum Fw of a peak of the {111} plane in an X-ray diffraction profile obtained using CuKα radiation was 0.366° or less. As a result, the number of fatigue cycles in the reverse bend test was less than $4.5 \times 10^{-4}$ times, and thus the austenitic stainless steel foil did not have excellent fatigue strength.

With respect to the austenitic stainless steel foil of Test Number 1-17, in the production process, the cold rolling rate CR2 in the second cold rolling was too low, and in addition, FnA was more than 0.80. As a result, the full width at half maximum Fw of a peak of the {111} plane in an X-ray diffraction profile obtained using CuKα radiation was 0.366° or less. As a result, the number of fatigue cycles in the reverse bend test was less than $4.5 \times 10^{-4}$ times, and thus the austenitic stainless steel foil did not have excellent fatigue strength.

With respect to the austenitic stainless steel foil of Test Number 1-18, in the production process, the tension in the tension annealing was too high, and in addition, FnA was more than 0.80. As a result, the full width at half maximum Fw of a peak of the {111} plane in an X-ray diffraction profile obtained using CuKα radiation was 0.366° or less. As a result, the number of fatigue cycles in the reverse bend test was less than $4.5 \times 10^{-4}$ times, and thus the austenitic stainless steel foil did not have excellent fatigue strength.

With respect to the austenitic stainless steel foil of Test Number 1-19, in the production process, the annealing temperature in the tension annealing was too high, the tension in the tension annealing was too high, and in addition, FnA was more than 0.80. As a result, the full width at half maximum Fw of a peak of the {111} plane in an X-ray diffraction profile obtained using CuKα radiation was 0.366° or less. As a result, the number of fatigue cycles in the reverse bend test was less than $4.5 \times 10^{-4}$ times, and thus the austenitic stainless steel foil did not have excellent fatigue strength.

With respect to the austenitic stainless steel foil of Test Number 1-20, in the production process, the tension in the tension annealing was too high. As a result, the full width at half maximum Fw of a peak of the {111} plane in an X-ray diffraction profile obtained using CuKα radiation was 0.366° or less. As a result, the number of fatigue cycles in the reverse bend test was less than $4.5 \times 10^{-4}$ times, and thus the austenitic stainless steel foil did not have excellent fatigue strength.

With respect to the austenitic stainless steel foil of Test Number 1-21, in the production process, FnA was more than 0.80. As a result, the full width at half maximum Fw of a peak of the {111} plane in an X-ray diffraction profile obtained using CuKα radiation was 0.366° or less. As a result, the number of fatigue cycles in the reverse bend test was less than $4.5 \times 10^{-4}$ times, and thus the austenitic stainless steel foil did not have excellent fatigue strength.

Example 2

Similarly to Example 1, slabs of the steels A to L described in Table 1 were subjected to hot rolling and annealing to produce hot-rolled coils having a thickness of 4 mm. Similarly to Example 1, cold rolling and annealing were repeatedly performed on the produced hot-rolled coils of the steels A to L to thereby produce intermediate steel materials (cold-rolled coils) in a foil band shape having a thickness of 300 μm.

With respect to Test Numbers 2-1 to 2-18, a first cold rolling was performed under the conditions described in Table 4 using the intermediate steel materials of the steels A to L. Specifically, the intermediate steel materials of Test Numbers 2-1 to 2-18 were repeatedly subjected to a first cold rolling and bright annealing for the number of times described in Table 4. More specifically, if "1 time" is described in Table 4, it means that the first cold rolling and the bright annealing were each performed one time. If "2 times" is described in Table 4, it means that a combination of the first cold rolling and the bright annealing was repeated two times.

C.) and annealing time (secs) in the bright annealing performed on the intermediate steel materials of Test Numbers 2-1 to 2-18 are shown in Table 4.

In addition, with respect to the atmospheric gas used when performing the bright annealing, if the dew point was less than −73° C., it was determined as being suitable ("A" (Acceptable) in Table 4). On the other hand, with respect to the atmospheric gas used when performing the bright annealing, if the dew point was −73° C. or more, it was determined as being unsuitable ("NA" (Not Acceptable) in Table 4). Note that, the dew point in Test Number 2-18 was −50° C. Further, the dew point in Test Numbers 2-1 to 2-18 was measured in a heating zone of the heat treatment furnace used for performing the bright annealing. In addition, the $N_2$ fraction (%) in the atmospheric gas used when performing the bright annealing is shown in Table 4.

A second cold rolling was performed on the intermediate steel materials of Test Numbers 2-1 to 2-18 on which bright annealing had been performed. The cold rolling rate CR2(%) of the second cold rolling performed on the intermediate steel materials of Test Numbers 2-1 to 2-18 is shown in Table 4. The intermediate steel materials on which the second cold rolling had been performed were subjected to tension annealing. The annealing temperature (° C.) in the tension annealing performed on the intermediate steel materials of Test Numbers 2-1 to 2-18 is shown in Table 4. In addition, the tension (N/mm 2) in the tension annealing

TABLE 4

| Test Number | Steel | First Cold Rolling Number of Cycles (times) | CR1 (%) | Bright Annealing Annealing Temperature (° C.) | Annealing Time (secs) | Dew Point | $N_2$ Fraction (%) | Second Cold Rolling CR2 (%) | Tension Annealing Annealing Temperature (° C.) | Tension (N/mm²) | FnA | FnB | Full width at half maximum Fw (°) | Uniform Strain e (×10⁻⁴) | Number of Fatigue Cycles (×10⁴ times) |
|---|---|---|---|---|---|---|---|---|---|---|---|---|---|---|---|
| 2-1 | A | 1 | 56 | 1100 | 5 | A | 45 | 75 | 350 | 5.0 | 0.55 | 0.31 | 0.591 | −35.61 | 51.0 |
| 2-2 | B | 1 | 75 | 900 | 10 | A | 50 | 50 | 350 | 6.0 | 0.73 | 0.21 | 0.552 | −30.07 | 43.0 |
| 2-3 | C | 1 | 70 | 1000 | 5 | A | 50 | 50 | 400 | 5.0 | 0.41 | 0.27 | 0.528 | −26.75 | 37.0 |
| 2-4 | D | 1 | 70 | 950 | 10 | A | 50 | 50 | 450 | 4.0 | 0.57 | 0.32 | 0.512 | −24.73 | 35.0 |
| 2-5 | E | 1 | 56 | 1100 | 5 | A | 50 | 50 | 500 | 5.0 | 0.22 | 0.28 | 0.473 | −21.46 | 30.0 |
| 2-6 | F | 1 | 75 | 1100 | 10 | A | 50 | 50 | 550 | 2.0 | 0.54 | 0.16 | 0.550 | −33.39 | 45.0 |
| 2-7 | G | 1 | 56 | 1100 | 5 | A | 50 | 50 | 600 | 4.5 | 0.24 | 0.28 | 0.462 | −17.66 | 25.0 |
| 2-8 | A | 1 | 56 | 1100 | 5 | A | 50 | 50 | 650 | 3.0 | 0.34 | 0.28 | 0.420 | −12.56 | 17.0 |
| 2-9 | H | 1 | 56 | 1100 | 5 | A | 50 | 50 | 700 | 4.0 | 0.34 | 0.28 | 0.428 | −13.62 | 19.0 |
| 2-10 | I | 1 | 56 | 1150 | 5 | A | 50 | 50 | 750 | 4.0 | 0.53 | 0.37 | 0.375 | −5.45 | 10.0 |
| 2-11 | J | 2 | 56 | 1100 | 5 | A | 50 | 50 | 800 | 5.0 | 0.28 | 0.28 | 0.395 | −8.46 | 12.0 |
| 2-12 | K | 2 | 56 | 1200 | 5 | A | 55 | 50 | 850 | 5.0 | 0.74 | 0.34 | 0.525 | −29.34 | 39.0 |
| 2-13 | L | 1 | 75 | 1100 | 5 | A | 50 | 52 | 500 | 5.0 | 0.37 | 0.19 | 0.542 | −31.40 | 41.0 |
| 2-14 | A | 2 | 43 | 1100 | 5 | A | 50 | 50 | 650 | 8.0 | 0.64 | 0.03 | 0.320 | −0.80 | 3.0 |
| 2-15 | A | 1 | 50 | 850 | 5 | A | 50 | 50 | 650 | 10.0 | 2.75 | −0.88 | 0.343 | −2.40 | 4.0 |
| 2-16 | A | 1 | 56 | 1100 | 5 | A | 50 | 44 | 700 | 16.0 | 13.98 | 0.08 | 0.345 | −0.70 | 4.0 |
| 2-17 | A | 1 | 60 | 1200 | 10 | A | 50 | 60 | 650 | 0.4 | 0.59 | −0.05 | 0.335 | −2.51 | 4.0 |
| 2-18 | A | 1 | 56 | 1100 | 5 | NA | 55 | 75 | 650 | 6.0 | 0.33 | 0.31 | 0.367 | −2.80 | 4.5 |

The cold rolling rate CR1(%) of the first cold rolling performed on the intermediate steel materials of Test Numbers 2-1 to 2-18 is shown in Table 4. Note that, with respect to the intermediate steel materials of Test Numbers 2-11, 2-12, and 2-14 on which the first cold rolling was performed two times, the cold rolling rate CR1 of the first cold rolling was the same cold rolling rate for each of the two times. Bright annealing was performed on the intermediate steel materials of Test Numbers 2-1 to 2-18 on which the first cold rolling had been performed. The annealing temperature (° performed on the intermediate steel materials of Test Numbers 2-1 to 2-18 is shown in Table 4.

In addition, Eq1, Eq2, Eq3, Eq4, Eq5, Eq6, LM, Eq7, FnA, and FnB were determined using the conditions of the first cold rolling, the bright annealing, the second cold rolling, and the tension annealing, and the above Formulae (2) to (11). The determined FnA and FnB are shown in Table 4. The determined Eq1, Eq2, Eq3, Eq4, Eq5, Eq6, LM, Eq7, FnA, and FnB are shown in Table 5.

TABLE 5

| Test Number | Eq1 | Eq2 | Eq3 | Eq4 | Eq5 | Eq6 | LM | Eq7 | FnA | FnB |
|---|---|---|---|---|---|---|---|---|---|---|
| 2-1 | 0.74 | 0.38 | 0.90 | 1.00 | 0.33 | 0.29 | 29029 | 0.89 | 0.55 | 0.31 |
| 2-2 | 0.38 | 0.34 | 0.47 | 0.90 | 0.33 | 0.12 | 25153 | 0.36 | 0.73 | 0.21 |
| 2-3 | 0.71 | 0.34 | 0.90 | 0.91 | 0.47 | 0.29 | 26915 | 0.89 | 0.41 | 0.27 |
| 2-4 | 0.71 | 0.34 | 0.75 | 0.90 | 0.63 | 0.46 | 26226 | 0.75 | 0.57 | 0.32 |
| 2-5 | 0.74 | 0.34 | 0.90 | 1.00 | 0.78 | 0.29 | 29029 | 0.89 | 0.22 | 0.28 |
| 2-6 | 0.38 | 0.34 | 0.81 | 1.01 | 0.91 | 0.33 | 29442 | 0.81 | 0.54 | 0.16 |
| 2-7 | 0.74 | 0.34 | 0.90 | 1.00 | 0.99 | 0.39 | 29029 | 0.89 | 0.24 | 0.28 |
| 2-8 | 0.74 | 0.34 | 0.90 | 1.00 | 1.00 | 0.48 | 29029 | 0.89 | 0.34 | 0.28 |
| 2-9 | 0.74 | 0.34 | 0.90 | 1.00 | 0.94 | 0.46 | 29029 | 0.89 | 0.34 | 0.28 |
| 2-10 | 0.74 | 0.34 | 0.65 | 0.98 | 0.82 | 0.46 | 30086 | 0.63 | 0.53 | 0.37 |
| 2-11 | 0.74 | 0.34 | 0.90 | 1.00 | 0.67 | 0.29 | 29029 | 0.89 | 0.28 | 0.28 |
| 2-12 | 0.74 | 0.34 | 0.38 | 0.93 | 0.51 | 0.29 | 31143 | 0.20 | 0.74 | 0.34 |
| 2-13 | 0.38 | 0.46 | 0.90 | 1.00 | 0.78 | 0.29 | 29029 | 0.89 | 0.37 | 0.19 |
| 2-14 | 0.07 | 0.34 | 0.90 | 1.00 | 1.00 | 0.01 | 29029 | 0.89 | 0.64 | 0.03 |
| 2-15 | 0.34 | 0.34 | 0.18 | 0.89 | 1.00 | 0.00 | 23743 | −0.25 | 2.75 | −0.88 |
| 2-16 | 0.74 | 0.10 | 0.90 | 1.00 | 0.94 | 0.00 | 29029 | 0.89 | 13.98 | 0.08 |
| 2-17 | 0.95 | 0.95 | 0.28 | 0.92 | 1.00 | 0.07 | 31587 | 0.00 | 0.59 | −0.05 |
| 2-18 | 0.74 | 0.38 | 0.90 | 1.00 | 1.00 | 0.12 | 29029 | 0.89 | 0.33 | 0.31 |

[Evaluation Tests]

A full width at half maximum Fw measurement test, a uniform strain measurement test, and a reverse bend test were performed on the austenitic stainless steel foils of Test Numbers 2-1 to 2-18.

[Full Width at Half Maximum Fw Measurement Test]

Similarly to Example 1, a full width at half maximum Fw measurement test was performed under the conditions described above. The full width at half maximum Fw)(° of the {111} plane determined for each of Test Numbers 2-1 to 2-18 is shown in Table 4.

[Uniform Strain Measurement Test]

The uniform strain e of the austenitic stainless steel foil of each test number was determined under the conditions described above. Specifically, a test specimen was prepared from the austenitic stainless steel foil of each test number, and a diffraction profile was obtained by XRD. In the XRD, the radiation source was CuKα radiation, the tube voltage was set to 45 kV, and the tube current was set to 200 mA. Further, measurement was performed by a focusing method in which the diffraction angle (2θ) was set to the range of 40 to 50 degrees, at a step of 0.01 degrees, and a rate of 1°/min. The peak of the {111} plane was identified from the obtained diffraction profile, and the lattice spacing d (Å) was determined by Bragg's equation shown in the above Equation (A). The uniform strain e was determined using the obtained lattice spacing d (Å) of the (111) plane and the above Equation (B). Note that, in the present example, a measurement value 2.0782 Å was used as $d_0$. The uniform strain e ($\times 10^{-4}$) of the austenitic stainless steel foil of each test number that was determined is shown in Table 4.

[Reverse Bend Test]

A reverse bend test was performed under the aforementioned conditions on the austenitic stainless steel foil of each test number. Specifically, a test specimen was prepared from the austenitic stainless steel foil of each test number, and a reverse bend test was performed. The size of the test specimen was made 110 mm in the rolling direction of the steel foil, 100 mm in the width direction, and the same thickness as the thickness of the steel foil. Repeated bending stress was applied to the test specimen in a direction perpendicular to the rolling direction. The bending period was set to 1.25 Hz, the bend radius was set to 2 mm, and the bending angle was set to 0 to 125°. The number of times that bending stress was applied until the test specimen ruptured was defined as the "number of fatigue cycles". The obtained number of fatigue cycles (times) is shown in Table 4.

[Evaluation Results]

Referring to Table 1 and Table 4, in the austenitic stainless steel foils of Test Numbers 2-1 to 2-13 and 2-18, all the ranges of the chemical composition of the present embodiment were satisfied, and in addition, in the production method, the cold rolling rate CR1 in the first cold rolling, the annealing temperature, annealing time, and $N_2$ fraction in the bright annealing, the cold rolling rate CR2 in the second cold rolling, the annealing temperature and tension in the tension annealing, and FnA all satisfied the preferable ranges described in the present description. As a result, the full width at half maximum Fw of a peak of the {111} plane in an X-ray diffraction profile obtained using CuKα radiation was greater than 0.366°. As a result, the number of fatigue cycles in the reverse bend test was more than $4.5 \times 10^{-4}$ times, and thus the austenitic stainless steel foils each had excellent fatigue strength.

With respect to the austenitic stainless steel foils of Test Numbers 2-1 to 2-13, in addition, in the production method, the dew point of the atmospheric gas used when performing the bright annealing was less than −73° C. As a result, the uniform strain e was less than $-2.89 \times 10^{-4}$. Consequently, the number of fatigue cycles in the reverse bend test was more than $5.0 \times 10^{-4}$ times, and thus the austenitic stainless steel foils had more excellent fatigue strength.

On the other hand, with respect to the austenitic stainless steel foil of Test Number 2-14, in the production process, the cold rolling rate CR1 in the first cold rolling was too low, the tension in the tension annealing was too high, and in addition, FnB was less than 0.15. As a result, the full width at half maximum Fw of a peak of the {111} plane in an X-ray diffraction profile obtained using CuKα radiation was 0.366° or less. Further, as a result, the uniform strain e was $-2.89 \times 10^{-4}$ or more. Consequently, the number of fatigue cycles in the reverse bend test was less than $4.5 \times 10^{-4}$ times, and the austenitic stainless steel foil did not have excellent fatigue strength.

With respect to the austenitic stainless steel foil of Test Number 2-15, in the production process, the annealing temperature in the bright annealing was too low, FnA was more than 0.80, and in addition, FnB was less than 0.15. As a result, the full width at half maximum Fw of a peak of the {111} plane in an X-ray diffraction profile obtained using CuKα radiation was 0.366° or less. Further, as a result, the uniform strain e was −2.89×10⁻⁴ or more. Consequently, the number of fatigue cycles in the reverse bend test was less than 4.5×10⁻⁴ times, and the austenitic stainless steel foil did not have excellent fatigue strength.

With respect to the austenitic stainless steel foil of Test Number 2-16, in the production process, the cold rolling rate CR2 in the second cold rolling was too low, the tension in the tension annealing was too high, FnA was more than 0.80, and in addition, FnB was less than 0.15. As a result, the full width at half maximum Fw of a peak of the {111} plane in an X-ray diffraction profile obtained using CuKα radiation was 0.366° or less. Further, as a result, the uniform strain e was −2.89×10⁻⁴ or more. Consequently, the number of fatigue cycles in the reverse bend test was less than 4.5×10⁻⁴ times, and the austenitic stainless steel foil did not have excellent fatigue strength.

were repeatedly performed on the produced hot-rolled coils of the steels A to L to thereby produce intermediate steel materials (cold-rolled coils) in a foil band shape having a thickness of 300 μm.

With respect to Test Numbers 3-1 to 3-22, a first cold rolling was performed under the conditions described in Table 6 using the intermediate steel materials of the steels A to L. Specifically, the intermediate steel materials of Test Numbers 3-1 to 3-22 were repeatedly subjected to a first cold rolling and bright annealing for the number of times described in Table 6. More specifically, if "1 time" is described in Table 6, it means that the first cold rolling and the bright annealing were each performed one time. If "2 times" is described in Table 6, it means that a combination of the first cold rolling and the bright annealing was repeated two times.

TABLE 6

| Test Number | Steel | First Cold Rolling Number of Cycles (times) | CR1 (%) | Bright Annealing Annealing Temperature (° C.) | Annealing Time (secs) | $N_2$ Fraction (%) | Furnace Pressure (MPa) | Second Cold Rolling CR2 (%) | Tension Annealing Annealing Temperature (° C.) | Tension (N/mm²) | FnA | FnC | Full width at half maximum Fw (°) | Lattice spacing Ratio Fn1 | Number of Fatigue Cycles (×10⁴ times) | Residual Bend Angle (°) |
|---|---|---|---|---|---|---|---|---|---|---|---|---|---|---|---|---|
| 3-1 | A | 1 | 56 | 1100 | 5 | 45 | 100 | 75 | 350 | 4.0 | 0.75 | 1.48 | 0.592 | 1.0228 | 51.0 | 0.5 |
| 3-2 | B | 1 | 60 | 900 | 10 | 50 | 800 | 52 | 350 | 5.0 | 0.59 | 1.52 | 0.550 | 1.0228 | 45.0 | 0.0 |
| 3-3 | C | 1 | 70 | 1000 | 5 | 50 | 300 | 55 | 400 | 5.0 | 0.12 | 0.71 | 0.527 | 1.0226 | 36.0 | 5.0 |
| 3-4 | D | 1 | 70 | 950 | 10 | 50 | 500 | 50 | 450 | 2.0 | 0.42 | 0.89 | 0.511 | 1.0224 | 36.0 | 5.5 |
| 3-5 | E | 1 | 56 | 1100 | 5 | 50 | 150 | 50 | 500 | 5.0 | 0.22 | 1.03 | 0.475 | 1.0224 | 29.0 | 6.0 |
| 3-6 | F | 1 | 75 | 1100 | 10 | 50 | 200 | 55 | 550 | 5.0 | 0.20 | 0.92 | 0.550 | 1.0223 | 44.0 | 6.0 |
| 3-7 | G | 1 | 56 | 1100 | 5 | 50 | 500 | 50 | 600 | 5.0 | 0.12 | 0.65 | 0.460 | 1.0223 | 25.0 | 6.0 |
| 3-8 | A | 1 | 56 | 1100 | 5 | 50 | 500 | 50 | 650 | 5.0 | 0.11 | 0.64 | 0.415 | 1.0223 | 17.0 | 6.0 |
| 3-9 | H | 1 | 56 | 1100 | 5 | 50 | 500 | 50 | 700 | 4.0 | 0.34 | 0.67 | 0.427 | 1.0223 | 19.0 | 6.0 |
| 3-10 | I | 1 | 56 | 1150 | 5 | 50 | 400 | 50 | 750 | 5.0 | 0.33 | 0.86 | 0.374 | 1.0223 | 10.0 | 6.0 |
| 3-11 | J | 2 | 56 | 1100 | 5 | 50 | 500 | 50 | 800 | 5.0 | 0.28 | 0.81 | 0.394 | 1.0223 | 11.0 | 6.0 |
| 3-12 | K | 2 | 60 | 1200 | 5 | 55 | 300 | 52 | 850 | 5.0 | 0.50 | 1.09 | 0.526 | 1.0223 | 38.0 | 6.0 |
| 3-13 | L | 1 | 75 | 1100 | 5 | 50 | 500 | 56 | 500 | 5.0 | 0.17 | 0.70 | 0.540 | 1.0224 | 41.0 | 5.5 |
| 3-14 | A | 2 | 40 | 1100 | 5 | 50 | 500 | 50 | 650 | 5.0 | 1.47 | 2.00 | 0.260 | 1.0200 | 1.0 | 20.0 |
| 3-15 | A | 1 | 56 | 1300 | 5 | 50 | 50 | 50 | 650 | 16.0 | 13.47 | 2.27 | 0.324 | 1.0215 | 2.0 | 8.0 |
| 3-16 | A | 1 | 56 | 800 | 1 | 50 | 50 | 50 | 650 | 10.0 | 2.32 | 2.61 | 0.234 | 1.0213 | 2.5 | 8.5 |
| 3-17 | A | 1 | 56 | 1100 | 10 | 50 | 850 | 40 | 650 | 6.0 | 0.79 | 2.27 | 0.255 | 1.0205 | 1.0 | 14.5 |
| 3-18 | A | 1 | 45 | 1100 | 5 | 50 | 50 | 50 | 650 | 17.0 | 16.23 | 1.97 | 0.340 | 1.0201 | 2.0 | 20.0 |
| 3-19 | A | 1 | 45 | 1100 | 5 | 50 | 500 | 50 | 900 | 5.0 | 1.32 | 1.86 | 0.303 | 1.0212 | 2.0 | 9.0 |
| 3-20 | A | 1 | 50 | 1200 | 10 | 50 | 850 | 50 | 700 | 4.0 | 1.15 | 2.02 | 0.320 | 1.0211 | 0.8 | 9.5 |
| 3-21 | A | 1 | 50 | 1100 | 5 | 50 | 850 | 50 | 820 | 2.0 | 0.72 | 1.75 | 0.368 | 1.0205 | 4.5 | 14.5 |
| 3-22 | A | 1 | 48 | 1150 | 10 | 50 | 800 | 55 | 850 | 6.0 | 0.41 | 1.74 | 0.367 | 1.0201 | 7.0 | 20.0 |

With respect to the austenitic stainless steel foil of Test Number 2-17, in the production process, the tension in the tension annealing was too low, and in addition, FnB was less than 0.15. As a result, the full width at half maximum Fw of a peak of the {111} plane in an X-ray diffraction profile obtained using CuKα radiation was 0.366° or less. Further, as a result, the uniform strain e was −2.89×10⁻⁴ or more. Consequently, the number of fatigue cycles in the reverse bend test was less than 4.5×10⁻⁴ times, and the austenitic stainless steel foil did not have excellent fatigue strength.

Example 3

Similarly to Example 1, slabs of the steels A to L described in Table 1 were subjected to hot rolling and annealing to produce hot-rolled coils having a thickness of 4 mm. Similarly to Example 1, cold rolling and annealing The cold rolling rate CR1(%) of the first cold rolling performed on the intermediate steel materials of Test Numbers 3-1 to 3-22 is shown in Table 6. Note that, with respect to the intermediate steel materials of Test Numbers 3-11, 3-12, and 3-14 on which the first cold rolling was performed two times, the cold rolling rate CR1 of the first cold rolling was the same cold rolling rate for each of the two times. Bright annealing was performed on the intermediate steel materials of Test Numbers 3-1 to 3-22 on which the first cold rolling had been performed. The annealing temperature (° C.) and annealing time (secs) in the bright annealing performed on the intermediate steel materials of Test Numbers 3-1 to 3-22 are shown in Table 6. In addition, the $N_2$ fraction (%) in the atmospheric gas used when performing the bright annealing and the furnace pressure (Pa) are shown in Table 6.

A second cold rolling was performed on the intermediate steel materials of Test Numbers 3-1 to 3-22 on which bright annealing had been performed. The cold rolling rate CR2(%) of the second cold rolling performed on the intermediate steel materials of Test Numbers 3-1 to 3-22 is shown in Table 6. The intermediate steel materials on which the second cold rolling had been performed were subjected to tension annealing. The annealing temperature (° C.) in the tension annealing performed on the intermediate steel materials of Test Numbers 3-1 to 3-22 is shown in Table 6. In addition, the tension (N/mm 2) in the tension annealing performed on the intermediate steel materials of Test Numbers 3-1 to 3-22 is shown in Table 6.

In addition, Eq1, Eq2, Eq3, Eq4, Eq5, Eq6, LM, Eq8, FnA, and FnC were determined using the conditions of the first cold rolling, the bright annealing, the second cold rolling, and the tension annealing, and the above Formulae (2) to (9), (12) and (13). The determined FnA and FnC are shown in Table 6. The determined Eq1, Eq2, Eq3, Eq4, Eq5, Eq6, LM, Eq8, FnA, and FnC are shown in Table 7.

TABLE 7

| Test Number | Eq1 | Eq2 | Eq3 | Eq4 | Eq5 | Eq6 | LM | Eq8 | FnA | FnC |
|---|---|---|---|---|---|---|---|---|---|---|
| 3-1 | 0.74 | 0.38 | 0.90 | 1.00 | 0.33 | 0.46 | 29029 | 0.40 | 0.75 | 1.48 |
| 3-2 | 0.95 | 0.46 | 0.47 | 0.90 | 0.33 | 0.29 | 25153 | 0.40 | 0.59 | 1.52 |
| 3-3 | 0.71 | 0.67 | 0.90 | 0.91 | 0.47 | 0.29 | 26915 | 0.88 | 0.12 | 0.71 |
| 3-4 | 0.71 | 0.34 | 0.75 | 0.90 | 0.63 | 0.33 | 26226 | 1.02 | 0.42 | 0.89 |
| 3-5 | 0.74 | 0.34 | 0.90 | 1.00 | 0.78 | 0.29 | 29029 | 0.53 | 0.22 | 1.03 |
| 3-6 | 0.38 | 0.67 | 0.81 | 1.01 | 0.91 | 0.29 | 29442 | 0.65 | 0.20 | 0.92 |
| 3-7 | 0.74 | 0.34 | 0.90 | 1.00 | 0.99 | 0.29 | 29029 | 1.02 | 0.12 | 0.65 |
| 3-8 | 0.74 | 0.34 | 0.90 | 1.00 | 1.00 | 0.29 | 29029 | 1.02 | 0.11 | 0.64 |
| 3-9 | 0.74 | 0.34 | 0.90 | 1.00 | 0.94 | 0.46 | 29029 | 1.02 | 0.34 | 0.67 |
| 3-10 | 0.74 | 0.34 | 0.65 | 0.98 | 0.82 | 0.29 | 30086 | 1.02 | 0.33 | 0.86 |
| 3-11 | 0.74 | 0.34 | 0.90 | 1.00 | 0.67 | 0.29 | 29029 | 1.02 | 0.28 | 0.81 |
| 3-12 | 0.95 | 0.46 | 0.38 | 0.93 | 0.51 | 0.29 | 31143 | 0.88 | 0.50 | 1.09 |
| 3-13 | 0.38 | 0.74 | 0.90 | 1.00 | 0.78 | 0.29 | 29029 | 1.02 | 0.17 | 0.70 |
| 3-14 | 0.03 | 0.34 | 0.90 | 1.00 | 1.00 | 0.29 | 29029 | 1.02 | 1.47 | 2.00 |
| 3-15 | 0.74 | 0.34 | 0.07 | 0.90 | 1.00 | 0.00 | 33257 | 0.29 | 13.47 | 2.27 |
| 3-16 | 0.74 | 0.34 | 0.03 | 0.89 | 1.00 | 0.00 | 21936 | 0.29 | 2.32 | 2.61 |
| 3-17 | 0.74 | 0.03 | 0.81 | 1.01 | 1.00 | 0.12 | 29442 | 0.29 | 0.79 | 2.27 |
| 3-18 | 0.12 | 0.34 | 0.90 | 1.00 | 1.00 | 0.00 | 29029 | 0.29 | 16.23 | 1.97 |
| 3-19 | 0.12 | 0.34 | 0.90 | 1.00 | 0.37 | 0.29 | 29029 | 1.02 | 1.32 | 1.86 |
| 3-20 | 0.34 | 0.34 | 0.28 | 0.92 | 0.94 | 0.46 | 31587 | 0.29 | 1.15 | 2.02 |
| 3-21 | 0.34 | 0.34 | 0.90 | 1.00 | 0.61 | 0.33 | 29029 | 0.29 | 0.72 | 1.75 |
| 3-22 | 0.23 | 0.67 | 0.54 | 0.95 | 0.51 | 0.12 | 30514 | 0.40 | 0.41 | 1.74 |

[Evaluation Tests]

A full width at half maximum Fw measurement test, an Fn1 measurement test, a reverse bend test, and a residual bend angle measurement test were performed on the austenitic stainless steel foils of Test Numbers 3-1 to 3-22.

[Full Width at Half Maximum Fw Measurement Test]

Similarly to Example 1, a full width at half maximum Fw measurement test was performed under the conditions described above. The full width at half maximum Fw (°) of the {111} plane determined for each of Test Numbers 3-1 to 3-22 is shown in Table 6.

[Fn1 Measurement Test]

For the austenitic stainless steel foil of each test number, a ratio Fn1 of the lattice spacing $\{111\}\gamma$ of the {111} planes of the austenite phase to the lattice spacing $\{110\}\alpha'$ of the {110} planes of the martensite phase in an X-ray diffraction profile obtained using CuKα radiation was determined under the conditions described above. Specifically, a test specimen was prepared from the austenitic stainless steel foil of each test number and a diffraction profile was obtained by XRD. In the XRD, CuKα radiation was used as the radiation source, the tube voltage was set to 40 kV, and the tube current was set to 40 mA. Further, measurement was performed by a focusing method in which the diffraction angle (2θ) was set to a range of 40 to 50 degrees, at a step of 0.01 degrees, and a rate of 1°/min. The peaks of the {111} plane of the austenite phase and the {110} plane of the martensite phase were identified from the obtained diffraction profile, and the lattice spacing $\{111\}\gamma$ of the {111} planes of the austenite phase and the lattice spacing $\{110\}\alpha'$ of the {110} planes of the martensite phase were determined. Fn1 was determined based on the thus-determined $\{111\}\gamma$ and $\{110\}\alpha'$. The determined Fn1 is shown in Table 6.

[Reverse Bend Test]

The austenitic stainless steel foil of each test number was subjected to a reverse bend test under the conditions described above. Specifically, a test specimen was prepared from the austenitic stainless steel foil of each test number, and a reverse bend test was performed. The size of the test specimen was made 110 mm in the rolling direction of the steel foil, 100 mm in the width direction, and the same thickness as the thickness of the steel foil. Repeated bending stress was applied to the test specimen in a direction perpendicular to the rolling direction. The bending period was set to 1.25 Hz, the bend radius was set to 2 mm, and the bending angle was set to 0 to 125°. The number of times that bending stress was applied until the test specimen ruptured was defined as the "number of fatigue cycles". The obtained number of fatigue cycles (times) is shown in Table 6.

[Residual Bend Angle Measurement Test]

The austenitic stainless steel foil of each test number was subjected to a residual bend angle measurement test under the conditions described above. Specifically, a test specimen was prepared from the austenitic stainless steel foil of each test number, and a residual bend angle measurement test was performed. The size of the test specimen was made 110 mm in the rolling direction of the steel foil, 100 mm in the width direction, and the same thickness as the thickness of the steel foil. Bending stress in a direction perpendicular to the rolling direction was repeatedly applied 20,000 times (twenty thousand times) to the test specimen. The bending period was set to 1.25 Hz, the bend radius was set to 2.5 mm, and the bending angle was set to 0 to 125°. As illustrated in FIG. 3, the test specimen of each test number was placed in a stationary state on a flat desk, and a photograph thereof was taken from the direction above the top surface of the desk. A residual bend angle denoted by reference numeral 100 in FIG. 3 was determined based on the obtained photographic image. The obtained residual bend angle)(° is shown in Table 6.

[Evaluation Results]

Referring to Table 1 and Table 6, in the austenitic stainless steel foils of Test Numbers 3-1 to 3-13, 3-21, and 3-22, all the ranges of the chemical composition of the present embodiment were satisfied, and in addition, in the production method, the cold rolling rate CR1 in the first cold rolling, the annealing temperature, annealing time, and $N_2$ fraction in the bright annealing, the cold rolling rate CR2 in the second cold rolling, the annealing temperature and tension in the tension annealing, and FnA all satisfied the preferable ranges described in the present description. As a result, the full width at half maximum Fw of a peak of the {111} plane in an X-ray diffraction profile obtained using CuKα radiation was greater than 0.366°. As a result, the number of fatigue cycles in the reverse bend test was more than $4.5\times10^{-4}$ times, and thus each of these austenitic stainless steel foils had excellent fatigue strength.

With respect to the austenitic stainless steel foils of Test Numbers 3-1 to 3-13, in addition, in the production method, the furnace pressure in the bright annealing was 100 to 800 Pa. As a result, the ratio Fn1 of the lattice spacing {111}γ of the {111} planes of the austenite phase to the lattice spacing {110}α' of the {110} planes of the martensite phase in an X-ray diffraction profile obtained using CuKα radiation was 1.0220 or more. As a result, the residual bend angle in the residual bend angle measurement test was 6.0° or less, and thus each of these austenitic stainless steel foils had excellent durability with respect to bending stress.

On the other hand, with respect to the austenitic stainless steel foil of Test Number 3-14, in the production process, the cold rolling rate CR1 in the first cold rolling was too low, FnA was more than 0.80, and in addition, FnC was more than 1.70. As a result, the full width at half maximum Fw of a peak of the {111} plane in an X-ray diffraction profile obtained using CuKα radiation was 0.366° or less. Further, as a result, Fn1 was less than 1.0220. Consequently, the number of fatigue cycles in the reverse bend test was less than $4.5\times10^{-4}$ times, and thus the austenitic stainless steel foil did not have excellent fatigue strength. Furthermore, as a result, the residual bend angle in the residual bend angle measurement test was more than 6.0°, and thus the austenitic stainless steel foil did not have excellent durability with respect to bending stress.

With respect to the austenitic stainless steel foil of Test Number 3-15, in the production process, the annealing temperature in the bright annealing was too high, the furnace pressure in the bright annealing was too low, the tension in the tension annealing was too high, FnA was more than 0.80, and in addition, FnC was more than 1.70. As a result, the full width at half maximum Fw of a peak of the {111} plane in an X-ray diffraction profile obtained using CuKα radiation was 0.366° or less. Further, as a result, Fn1 was less than 1.0220. Consequently, the number of fatigue cycles in the reverse bend test was less than $4.5\times10^{-4}$ times, and thus the austenitic stainless steel foil did not have excellent fatigue strength. Furthermore, as a result, the residual bend angle in the residual bend angle measurement test was more than 6.0°, and thus the austenitic stainless steel foil did not have excellent durability with respect to bending stress.

With respect to the austenitic stainless steel foil of Test Number 3-16, in the production process, the annealing time in the bright annealing was too short, the furnace pressure in the bright annealing was too low, the tension in the tension annealing was too high, FnA was more than 0.80, and in addition, FnC was more than 1.70. As a result, the full width at half maximum Fw of a peak of the {111} plane in an X-ray diffraction profile obtained using CuKα radiation was 0.366° or less. Further, as a result, Fn1 was less than 1.0220. Consequently, the number of fatigue cycles in the reverse bend test was less than $4.5\times10^{-4}$ times, and thus the austenitic stainless steel foil did not have excellent fatigue strength. Furthermore, as a result, the residual bend angle in the residual bend angle measurement test was more than 6.0°, and thus the austenitic stainless steel foil did not have excellent durability with respect to bending stress.

With respect to the austenitic stainless steel foil of Test Number 3-17, in the production process, the furnace pressure in the bright annealing was too high, the cold rolling rate CR2 in the second cold rolling was too low, and in addition, FnC was more than 1.70. As a result, the full width at half maximum Fw of a peak of the {111} plane in an X-ray diffraction profile obtained using CuKα radiation was 0.366° or less. Further, as a result, Fn1 was less than 1.0220. Consequently, the number of fatigue cycles in the reverse bend test was less than $4.5\times10^{-4}$ times, and thus the austenitic stainless steel foil did not have excellent fatigue strength. Furthermore, as a result, the residual bend angle in the residual bend angle measurement test was more than 6.0°, and thus the austenitic stainless steel foil did not have excellent durability with respect to bending stress.

With respect to the austenitic stainless steel foil of Test Number 3-18, in the production process, the furnace pressure in the bright annealing was too low, the tension in the tension annealing was too high, FnA was more than 0.80, and in addition, FnC was more than 1.70. As a result, the full width at half maximum Fw of a peak of the {111} plane in an X-ray diffraction profile obtained using CuKα radiation was 0.366° or less. Further, as a result, Fn1 was less than 1.0220. Consequently, the number of fatigue cycles in the reverse bend test was less than $4.5\times10^{-4}$ times, and thus the austenitic stainless steel foil did not have excellent fatigue strength. Furthermore, as a result, the residual bend angle in the residual bend angle measurement test was more than 6.0°, and thus the austenitic stainless steel foil did not have excellent durability with respect to bending stress.

With respect to the austenitic stainless steel foil of Test Number 3-19, in the production process, the annealing temperature in the tension annealing was too high, FnA was more than 0.80, and in addition, FnC was more than 1.70. As a result, the full width at half maximum Fw of a peak of the {111} plane in an X-ray diffraction profile obtained using CuKα radiation was 0.366° or less. Further, as a result, Fn1 was less than 1.0220. Consequently, the number of fatigue cycles in the reverse bend test was less than $4.5\times10^{-4}$ times, and thus the austenitic stainless steel foil did not have excellent fatigue strength. Furthermore, as a result, the residual bend angle in the residual bend angle measurement test was more than 6.0°, and thus the austenitic stainless steel foil did not have excellent durability with respect to bending stress.

With respect to the austenitic stainless steel foil of Test Number 3-20, in the production process, the furnace pressure in the bright annealing was too high, FnA was more than 0.80, and in addition, FnC was more than 1.70. As a result, the full width at half maximum Fw of a peak of the {111} plane in an X-ray diffraction profile obtained using CuKα radiation was 0.366° or less. Further, as a result, Fn1 was less than 1.0220. Consequently, the number of fatigue cycles in the reverse bend test was less than $4.5 \times 10^{-4}$ times, and thus the austenitic stainless steel foil did not have excellent fatigue strength. Furthermore, as a result, the residual bend angle in the residual bend angle measurement test was more than 6.0°, and thus the austenitic stainless steel foil did not have excellent durability with respect to bending stress.

An embodiment of the present disclosure has been described above. However, the embodiment described above is merely an example for carrying out the present disclosure. Therefore, the present disclosure is not limited to the above-described embodiment, and can be implemented by appropriately modifying the above-described embodiment within a range not departing from the spirit thereof.

The invention claimed is:

1. An austenitic stainless steel foil, consisting of, in mass %,
C: 0.150% or less,
Si: 1.00% or less,
Mn: 2.00% or less,
P: 0.045% or less,
S: 0.0300% or less,
Cr: 16.00 to 20.00%,
Ni: 6.00 to 10.50%,
N: 0.100% or less,
Mo: 0 to 2.50%,
Nb: 0 to 0.12%,
V: 0 to 1.00%,
Ta: 0 to 0.50%,
Hf: 0 to 0.10%,
Co: 0 to 0.50%,
B: 0 to 0.0100%,
Ca: 0 to 0.0200%,
Mg: 0 to 0.0200%,
rare earth metal: 0 to 0.0100%,
Al: 0 to 0.010%,
Ti: 0 to 0.500%,
Zr: 0 to 0.100%, and
Cu: 0 to 3.00%,
with the balance being Fe and impurities,
wherein:
in an X-ray diffraction profile obtained using CuKα radiation, a full width at half maximum Fw of a peak of a {111} plane is greater than 0.366°.

2. The austenitic stainless steel foil according to claim 1, containing one or more of:
Mo: 0.01 to 2.50%,
Nb: 0.01 to 0.12%,
V: 0.01 to 1.00%,
Ta: 0.01 to 0.50%,
Hf: 0.01 to 0.10%,
Co: 0.01 to 0.50%,
B: 0.0001 to 0.0100%,
Ca: 0.0001 to 0.0200%,
Mg: 0.0001 to 0.0200%,
rare earth metal: 0.0001 to 0.0100%,
Al: 0.001 to 0.010%,
Ti: 0.001 to 0.500%,
Zr: 0.001 to 0.100%, and
Cu: 0.01 to 3.00%.

3. The austenitic stainless steel foil according to claim 1, wherein:
a uniform strain e is less than $-2.89 \times 10^{-4}$.

4. The austenitic stainless steel foil according to claim 2, wherein:
a uniform strain e is less than $-2.89 \times 10^{-4}$.

5. The austenitic stainless steel foil according to claim 1, wherein:
in an X-ray diffraction profile obtained using CuKα radiation, a ratio of a lattice spacing $\{111\}\gamma$ of $\{111\}$ planes of an austenite phase to a lattice spacing $\{110\}\alpha'$ of $\{110\}$ planes of a martensite phase satisfies Formula (1);

$$\{111\}\gamma/\{110\}\alpha' \geq 1.0220 \qquad (1).$$

6. The austenitic stainless steel foil according to claim 2, wherein:
in an X-ray diffraction profile obtained using CuKα radiation, a ratio of a lattice spacing $\{111\}\gamma$ of $\{111\}$ planes of an austenite phase to a lattice spacing $\{110\}\alpha'$ of $\{110\}$ planes of a martensite phase satisfies Formula (1);

$$\{111\}\gamma/\{110\}\alpha' \geq 1.0220 \qquad (1).$$

7. The austenitic stainless steel foil according to claim 3, wherein:
in an X-ray diffraction profile obtained using CuKα radiation, a ratio of a lattice spacing $\{111\}\gamma$ of $\{111\}$ planes of an austenite phase to a lattice spacing $\{110\}\alpha'$ of $\{110\}$ planes of a martensite phase satisfies Formula (1);

$$\{111\}\gamma/\{110\}\alpha' \geq 1.0220 \qquad (1).$$

8. The austenitic stainless steel foil according to claim 4, wherein:
in an X-ray diffraction profile obtained using CuKα radiation, a ratio of a lattice spacing $\{111\}\gamma$ of $\{111\}$ planes of an austenite phase to a lattice spacing $\{110\}\alpha'$ of $\{110\}$ planes of a martensite phase satisfies Formula (1);

$$\{111\}\gamma/\{110\}\alpha' \geq 1.0220 \qquad (1).$$

* * * * *